Sept. 11, 1962 G. W. MOSSOR 3,053,150
APPARATUS FOR MAKING PAPER BAGS
Filed March 11, 1957 16 Sheets-Sheet 1

Sept. 11, 1962 G. W. MOSSOR 3,053,150
APPARATUS FOR MAKING PAPER BAGS
Filed March 11, 1957 16 Sheets-Sheet 2

INVENTOR
George W. Mossor
BY
Curtis, Morris & Safford
ATTORNEYS

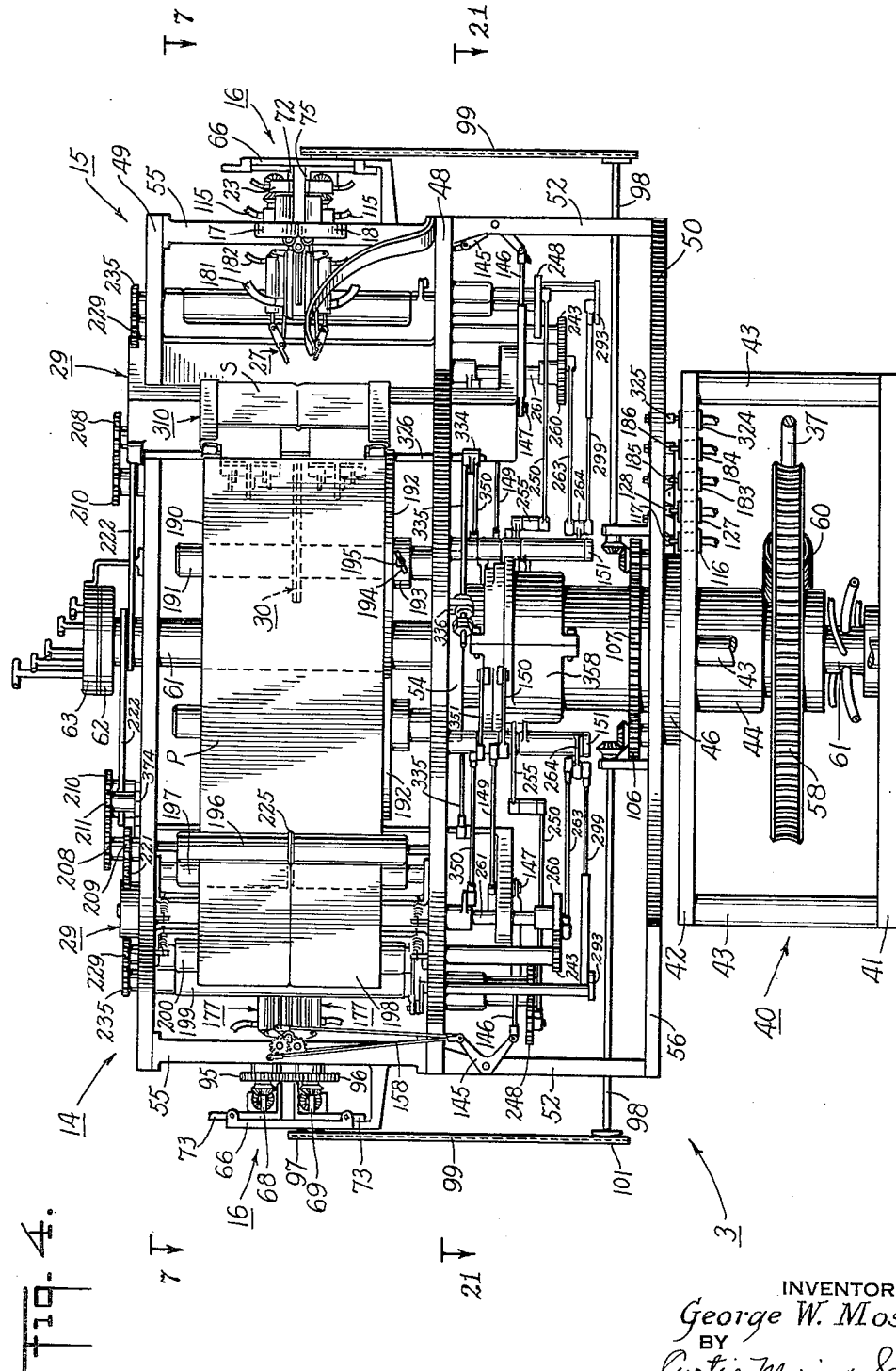

Sept. 11, 1962    G. W. MOSSOR    3,053,150
APPARATUS FOR MAKING PAPER BAGS
Filed March 11, 1957    16 Sheets-Sheet 4
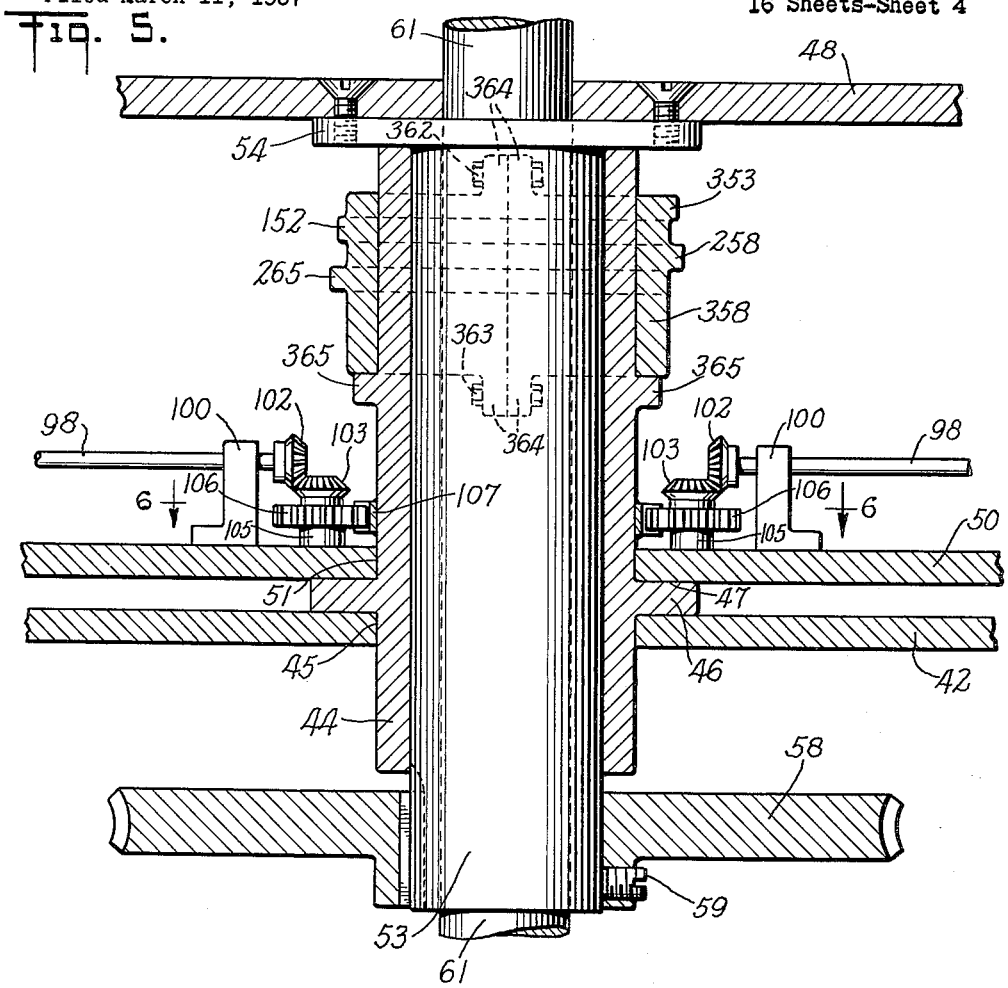
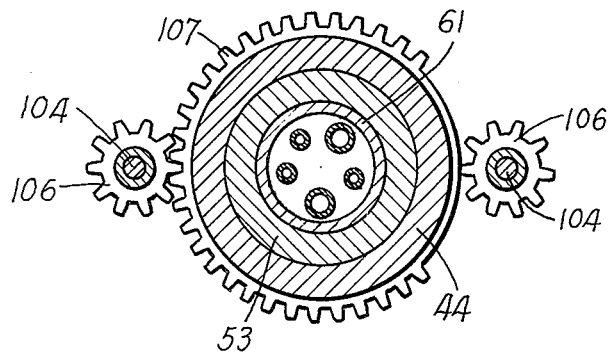
INVENTOR
George W. Mossor
BY
Curtis Morris + Safford
ATTORNEYS Sept. 11, 1962 G. W. MOSSOR 3,053,150
APPARATUS FOR MAKING PAPER BAGS
Filed March 11, 1957 16 Sheets-Sheet 5

INVENTOR
George W. Mossor
BY
Curtis Morris & Safford
ATTORNEYS

Sept. 11, 1962  G. W. MOSSOR  3,053,150
APPARATUS FOR MAKING PAPER BAGS
Filed March 11, 1957  16 Sheets-Sheet 6
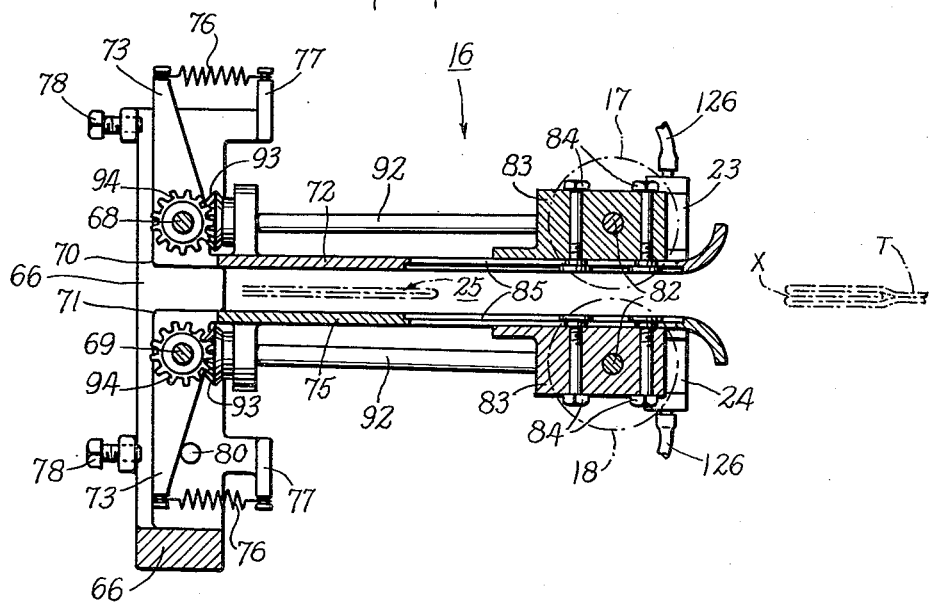
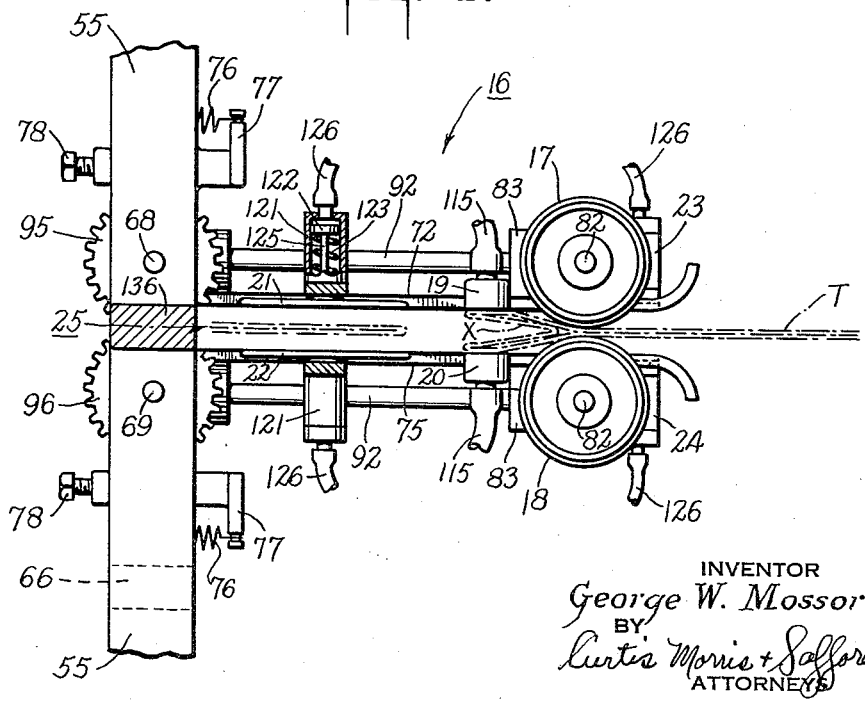
INVENTOR
George W. Mossor
BY
Curtis, Morris & Safford
ATTORNEYS Sept. 11, 1962
G. W. MOSSOR
3,053,150
APPARATUS FOR MAKING PAPER BAGS Filed March 11, 1957
16 Sheets-Sheet 7

INVENTOR
George W. Mossor
BY
Curtis Morris & Safford
ATTORNEYS

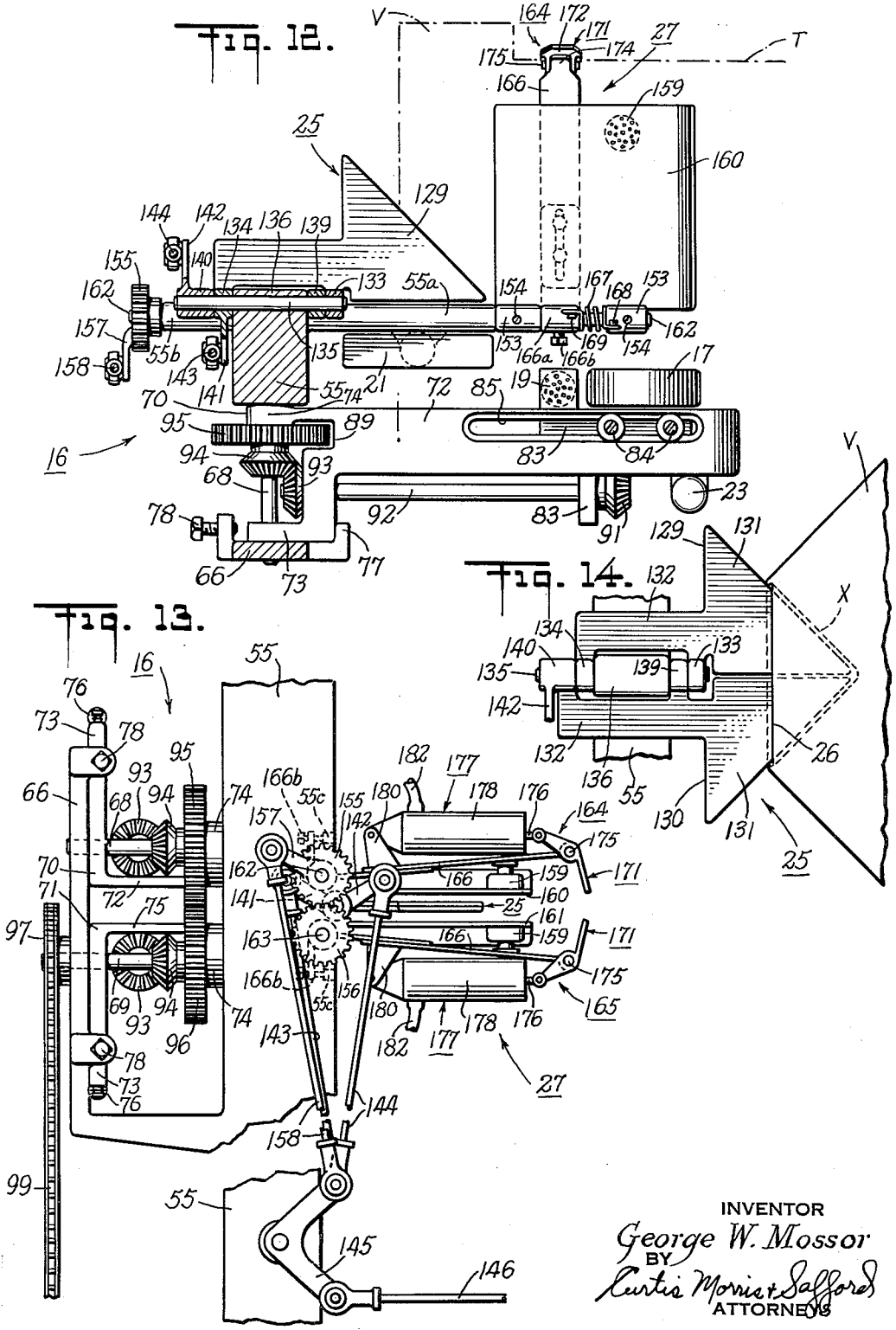

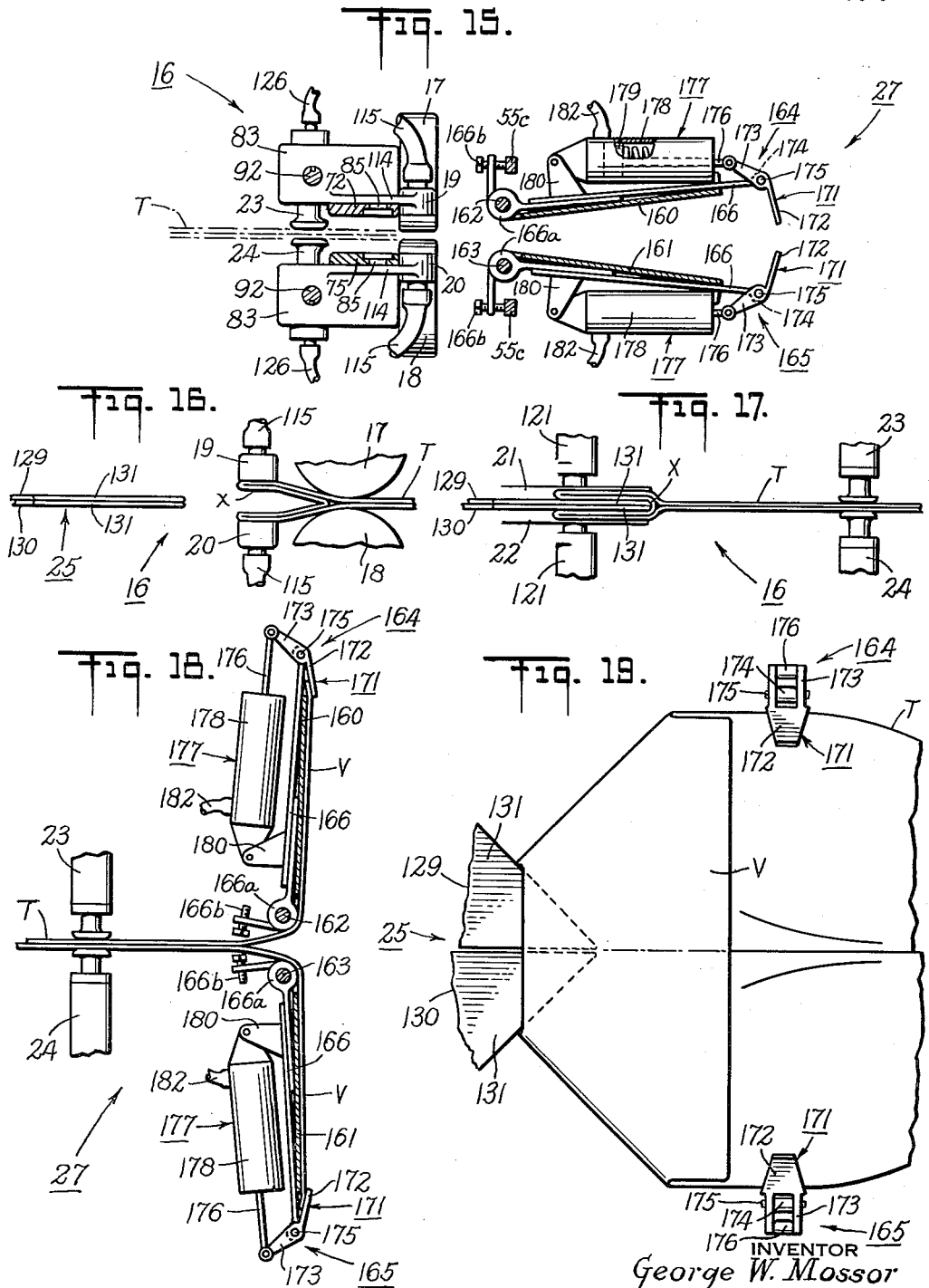

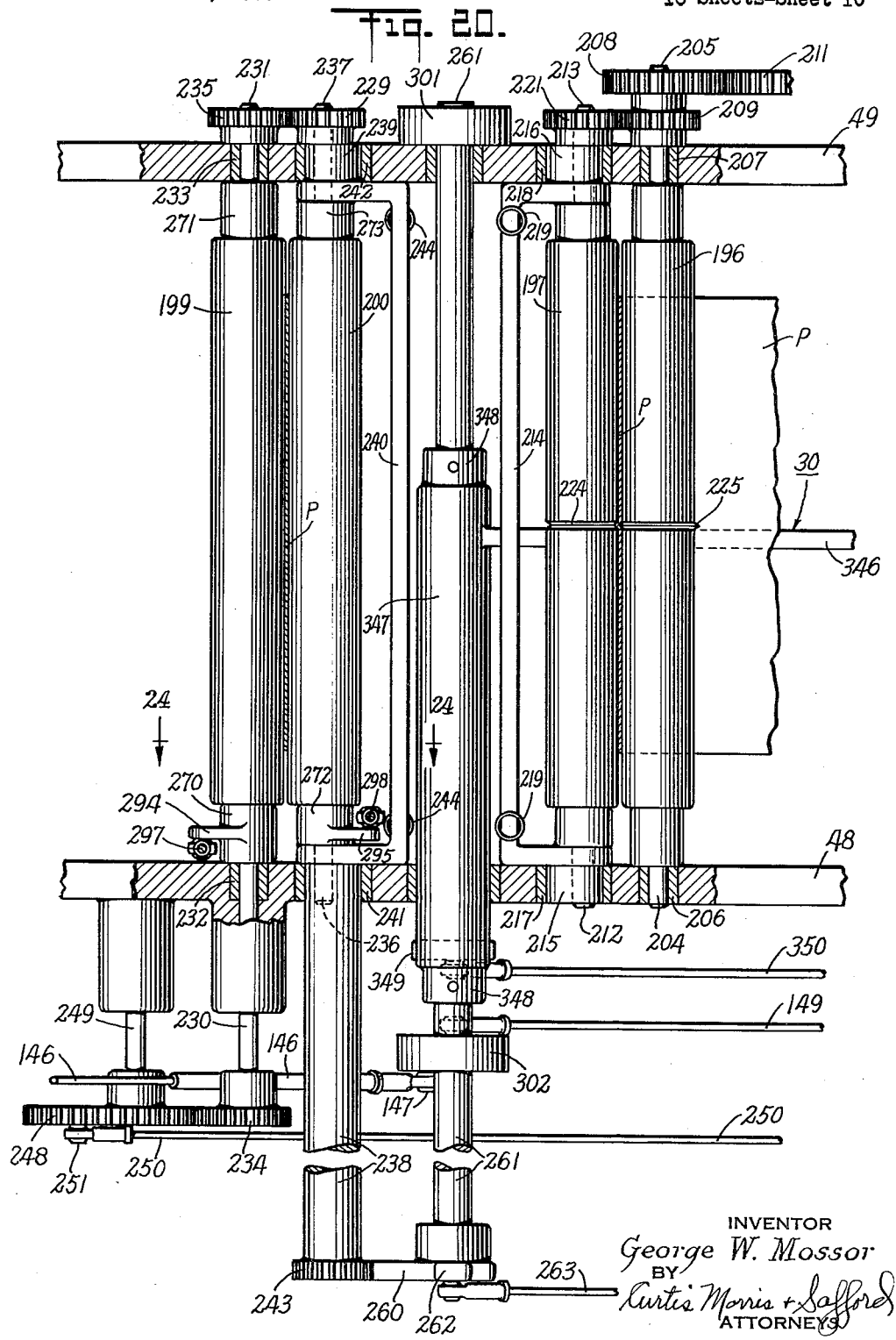

Sept. 11, 1962 G. W. MOSSOR 3,053,150
APPARATUS FOR MAKING PAPER BAGS
Filed March 11, 1957 16 Sheets-Sheet 11

INVENTOR
George W. Mossor
BY
Curtis Morris & Safford
ATTORNEYS

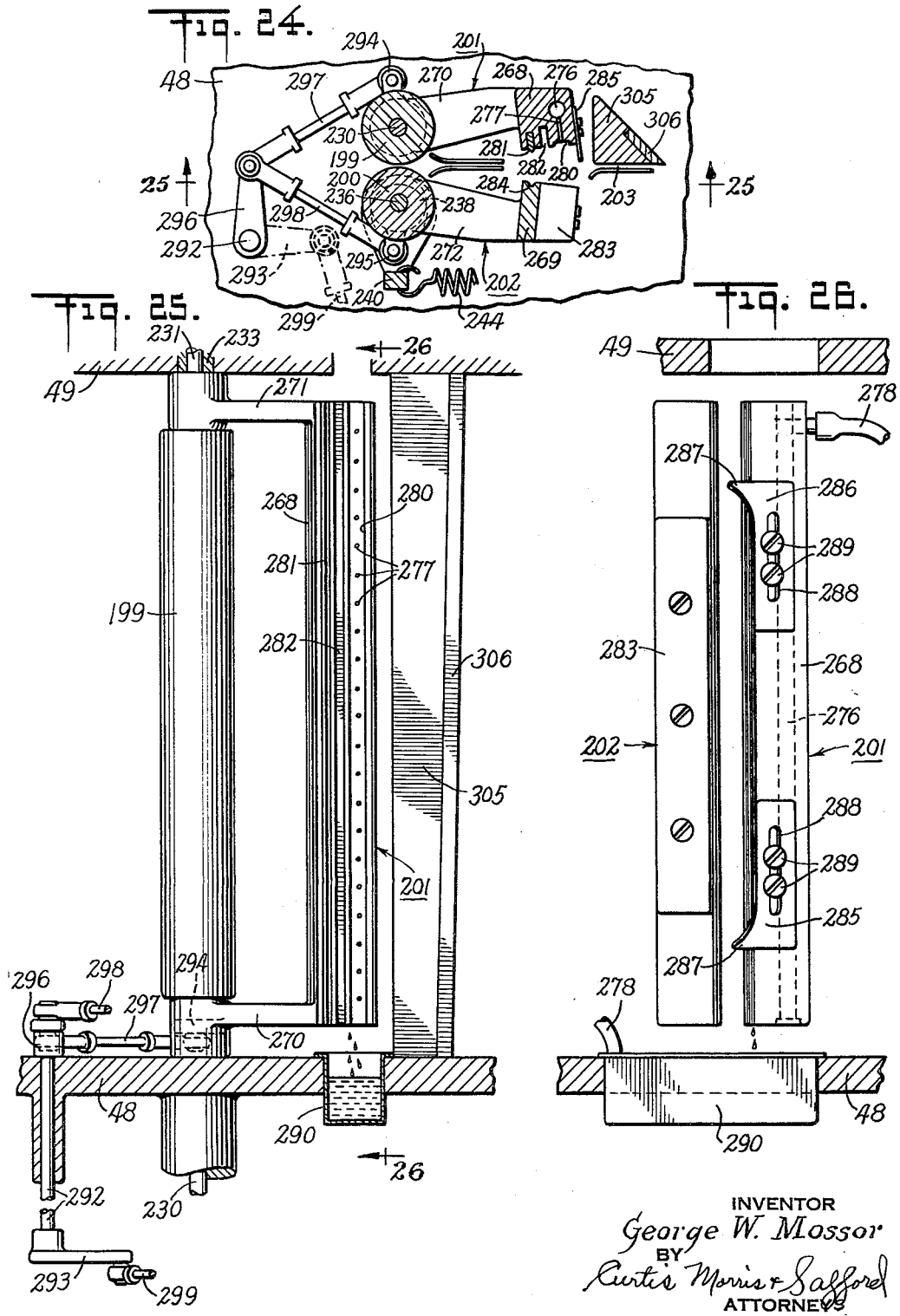

Sept. 11, 1962 G. W. MOSSOR 3,053,150
APPARATUS FOR MAKING PAPER BAGS
Filed March 11, 1957 16 Sheets-Sheet 13
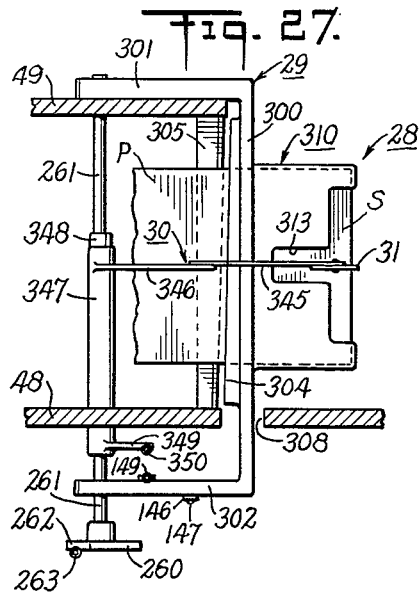
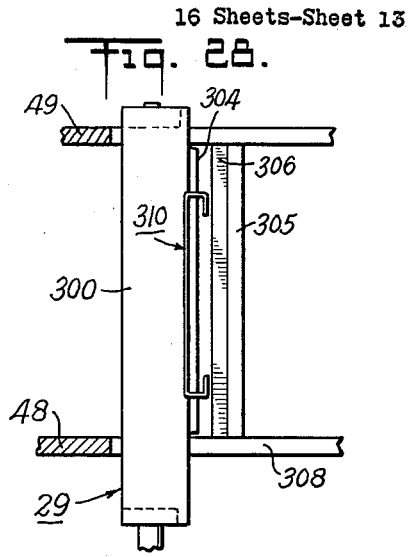
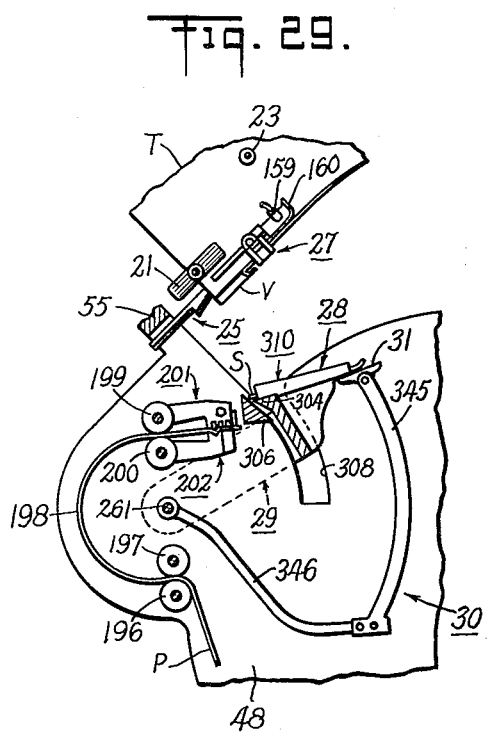
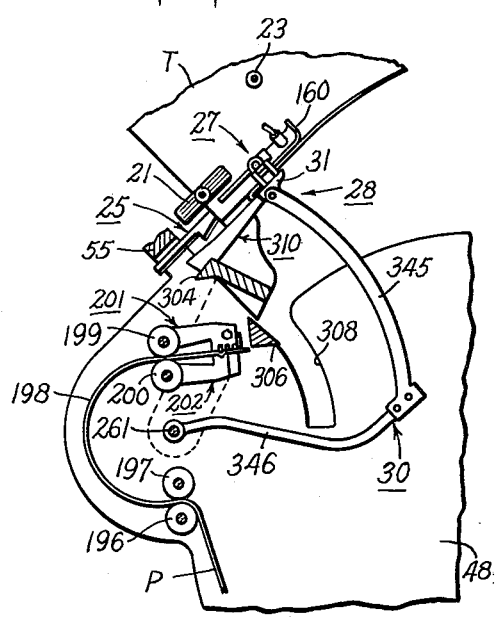
INVENTOR
George W. Mossor
BY
Curtis Morris + Safford
ATTORNEYS

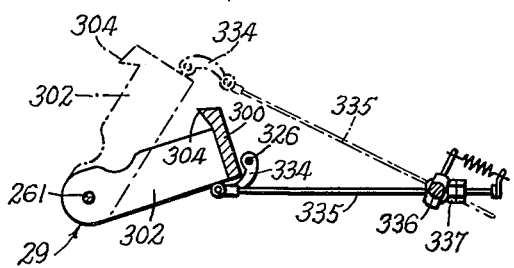
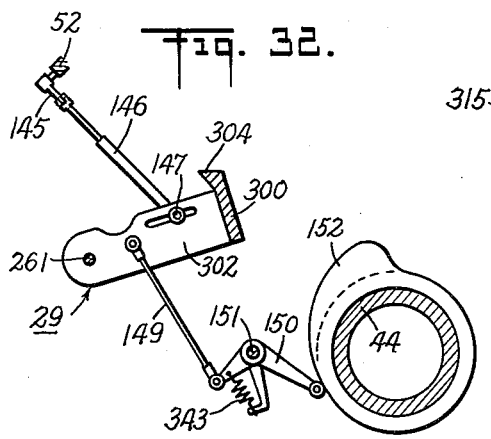
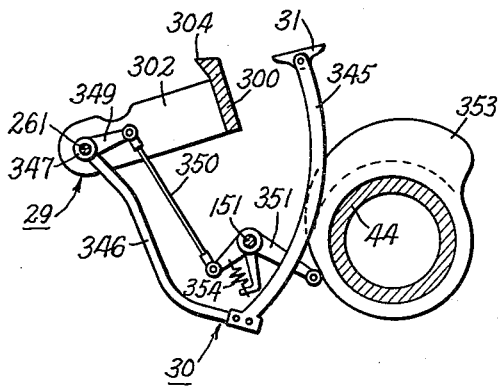
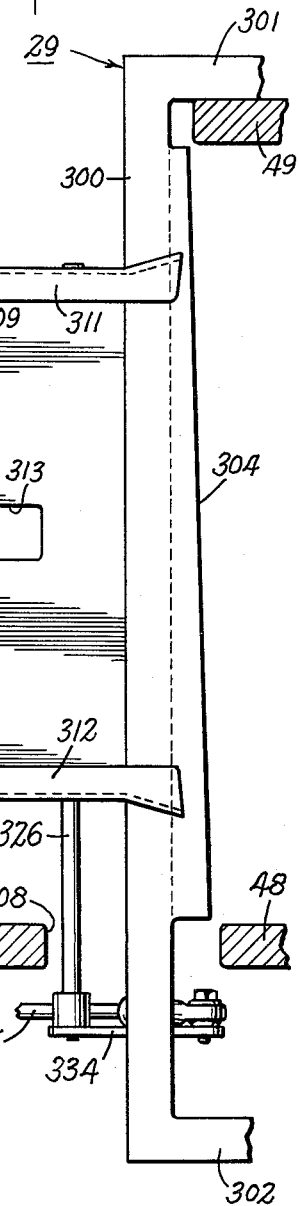

Sept. 11, 1962  G. W. MOSSOR  3,053,150
APPARATUS FOR MAKING PAPER BAGS
Filed March 11, 1957  16 Sheets-Sheet 15
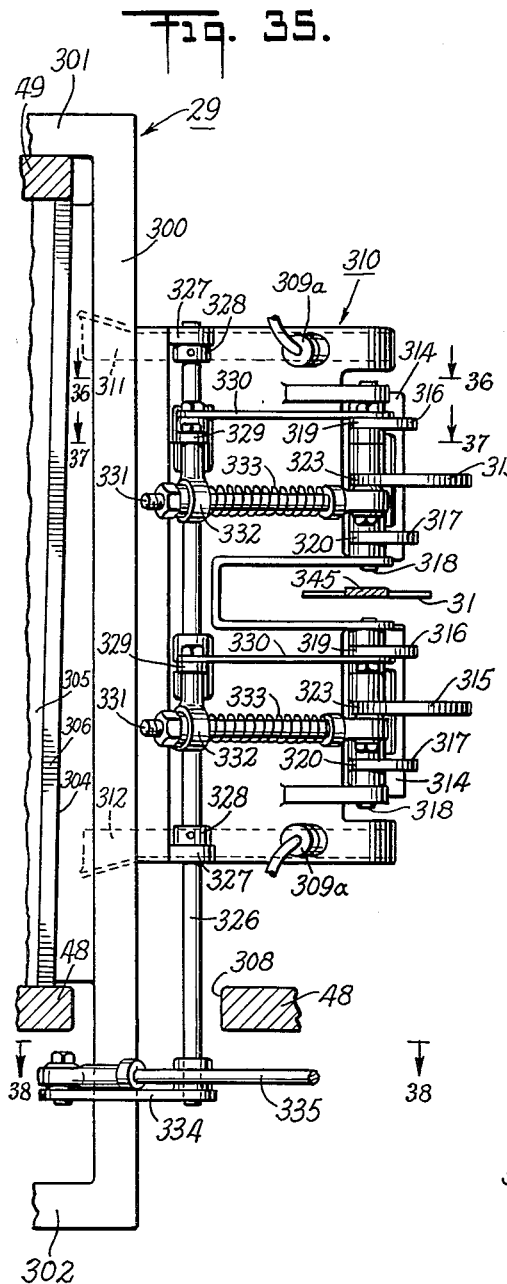
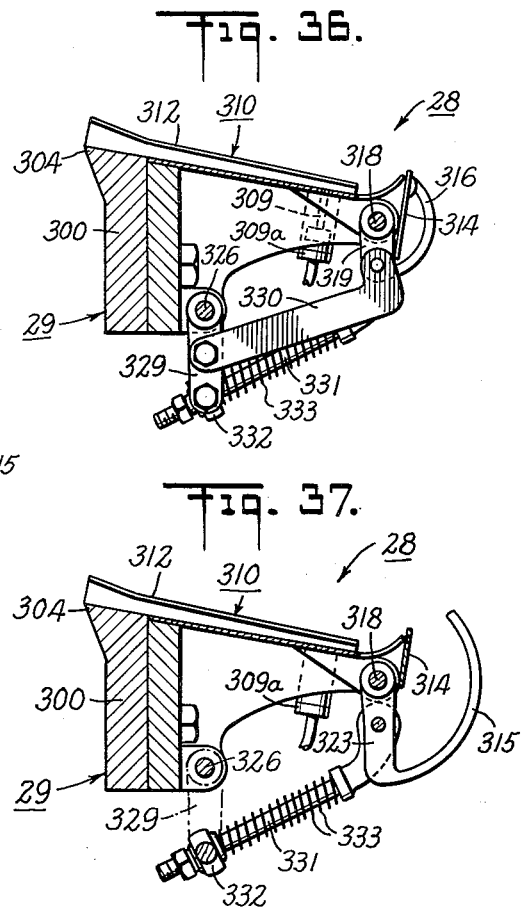
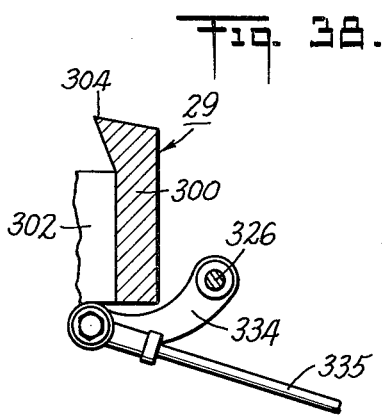
INVENTOR
George W. Mossor
BY
Curtis, Morris & Safford
ATTORNEYS INVENTOR
George W. Mossor
BY
Curtis Morris + Safford
ATTORNEYS United States Patent Office 3,053,150
Patented Sept. 11, 1962

3,053,150
APPARATUS FOR MAKING PAPER BAGS
George W. Mossor, Wellsburg, W. Va., assignor to Hudson Pulp & Paper Corp., New York, N.Y., a corporation of Maine
Filed Mar. 11, 1957, Ser. No. 645,079
60 Claims. (Cl. 93—8)

The present invention relates to an improved apparatus for making paper bags with sleeved valves from lengths of paper tubing. The instant application is a continuation-in-part of my prior application for U.S. Letters Patent Serial No. 611,093 filed September 19, 1956, now Patent 2,842,032, issued July 8, 1959, which, in turn, is a continuation of my original application Serial No. 295,673 filed June 26, 1952, and the instant application relates back to the original application for all common subject matter.

The practice of providing a valve in a corner of a paper bag to facilitate filling with bulk materials is well known. Such a valve is commonly formed by tucking in a corner of the bag to provide a relatively small opening through which a nozzle or spout may be inserted for the purpose of filling the bag with bulk material. In order to retain the bulk material in the bag, it has been customary to provide a sleeve for the valve which is, in effect, an extension of the valve. Such a sleeve is connected to the inner edge of the valve and doubled back thereon so that it projects outwardly through the valve opening. After the bag has been filled, the sleeve is pushed inwardly through the valve opening to a position in which it operates as a closure.

In the fabrication of paper bags with sleeved valves, the problem of applying the sleeve to the valves has been a particularly troublesome one. Heretofore, the assembly of the sleeves has been essentially a manual operation. While various forms of apparatus and methods have been proposed for the purpose of eliminating this manual operation, none of the proposals has proven entirely satisfactory, and the practice of applying the sleeves manually has continued.

My original application Serial No. 295,673 and the copending continuation thereof, Serial No. 611,093 (now Patent 2,842,032) referred to above, disclose and claim a machine for automatically forming and assembling sleeves on the valves of paper bags. In that machine, bag tubes with a valve previously formed therein are manually fed onto an intermittently operating conveyor which delivers them successively to a sleeve applying head. When a bag tube is in a sleeve-applying position, the conveyor stops and waits until a sleeve is applied thereto. After a sleeve has been applied to a bag tube the conveyor again starts to discharge the sleeved bag tube and advance the next tube to the sleeve-applying position. The apparatus of the present invention has features in common with the machine disclosed in my prior applications and relates back to said applications for all common subject matter.

One of the objects of the present invention is to provide an improved apparatus for automatically producing a finished sleeved valve type paper bag in one continuous operation.

Another object is to provide an apparatus of the type indicated which applies a sleeve to a bag tube before the valve is formed therein.

Another object is to provide an apparatus of the type indicated for performing the sleeve-applying and valve-forming operations on a bag tube during its continuous movement on a carrier.

Another object is to provide an apparatus of the type indicated which may be easily and quickly adjusted to adapt it for bags of different sizes and shapes.

Another object is to provide an apparatus of the type indicated in which a continuously rotating carrier moves relative to the bag tube to be formed and automatically clamps the bag tube thereto for movement therewith.

Another object is to provide an apparatus of the type indicated which first applies a sleeve to a portion of a bag tube and thereafter folds the sleeved portion to form a valve.

Another object is to provide an apparatus of the type indicated in which all of the various parts of the sleeve-forming and -applying and valve-forming mechanisms are automatically operated by the relative movement between the rotating carrier and its supporting structure.

Another object is to provide an apparatus of the type indicated in which the sequence of operation of the parts of the various sleeve-applying and valve-forming mechanisms are controlled by the angular position of the rotating carrier relative to the support on which it is mounted.

Another object is to provide a machine of the type indicated having a gusset-spreading mechanism of improved construction.

Another object is to provide a machine of the type indicated having sleeve-feeding and adhesive-applying mechanisms of improved construction.

Another object is to provide a machine of the type indicated having a control for the sleeve-feeding mechanism of improved construction.

Another object is to provide an improved apparatus for automatically forming a sleeve, applying the sleeve to a bag tube, forming a sleeved valve and stitching the ends of the bag to form a finished bag in one continuous operation.

Another object is to provide continuously operating conveyors for delivering tubes to the rotating carrier and delivering bag tubes with sleeved valves formed therein to sewing machines where the ends of the bags are stitched.

Still another object is to provide a high speed apparatus of the type indicated which is of relatively simple and compact construction and reliable in operation.

These and other objects will become more apparent from the following description and drawings in which like reference characters denote like parts throughout the several views. It is to be expressly understood, however, that the drawings are for the purpose of illustration only and not a definition of the limits of the invention, reference being had for this purpose to the appended claims.

In the drawings:

FIG. 4 is a side elevational view of the rotating carrier showing the various operating elements and driving means therefore;

FIG. 5 is a sectional view of the stationary bearing on which the carrier is rotatably mounted and showing the interchangeable cam element having separate cam tracks for operating the different mechanisms in their proper sequence;

FIG. 6 is a transverse sectional view taken on line 6—6 of FIG. 5 to show the planetary gears for operating the gusset-spreading rolls;

FIG. 8 is an enlarged sectional view taken on line 8—8 of FIG. 7 to show the pivotally mounted spaced arms of the intercepting mechanism on the carrier for receiving a bag tube therebetween;

FIG. 9 is a sectional view taken on line 9—9 of FIG. 7 to show the gusset-spreading rolls and suction nozzles and one pair of air operated clamps of the bag tube intercepting mechanism;

FIG. 12 is a sectional bottom plan view taken on line 12—12 of FIG. 11 to show one of the butterfly cams for spreading the gusset at one side of the bag tube, the gripper for spreading the end of the bag and the pivotal mounting for these elements;

FIG. 13 is an end view of the intercepting and bag-end-spreading mechanisms to show the operating means for rocking the butterfly wing plates and bag end grippers;

FIG. 14 is a side elevational view of the butterfly wing plates operated to their open position to spread the gusset of a bag tube;

FIG. 15 is a sectional view taken on line 15—15 of FIG. 11 showing the ends of the bag separated by the suction nozzles of the bag-end-spreading plates for engagement by the gripping fingers.

FIG. 16 is a diagrammatic view showing the cooperation of the gusset-spreading rolls and suction nozzles for opening the bag gusset to receive the butterfly spreaders;

FIG. 17 is a diagrammatic view of the end of a bag tube and showing the pairs of opposed clamps operated to grip the bag tube to the carrier for rotation therewith;

FIG. 18 is a diagrammatic view at right angles to that illustrated in FIG. 16 and showing the bag end spreaders operated to spread the end of the bag tube;

FIG. 19 is an end view of the bag tube as illustrated in FIG. 18 to show the valve portion spread into a flat plane at substantially right angles to the side of the bag tube;

FIG. 20 is a sectional view taken on line 20—20 of FIG. 7 to show the continuously operated and intermittently operated sets of feed rolls and control means therefor;

FIG. 24 is an enlarged sectional view taken on line 24—24 of FIG. 20 to show the transverse-creasing and adhesive-applying jaws;

FIG. 25 is a sectional view taken on line 25—25 of FIG. 24 to show the adhesive-applying face on one of the pivotally mounted creasing and adhesive-applying jaws;

FIG. 26 is a sectional view taken on line 26—26 of FIG. 25 to show the creasing and adhesive-applying jaws in end elevation;

FIG. 27 is a sectional view taken on line 27—27 of FIG. 7 to show the pivotally mounted shearing and sleeve-applying frame;

FIG. 28 is a sectional view taken on line 28—28 of FIG. 7 to show the cooperating shearing edges on the shearing frame and carrier;

FIG. 29 is a plan view of the shearing and sleeve-applying frame operated to shear a sleeve from the web of sleeve paper;

FIG. 30 is a view similar to FIG. 29 showing the shearing and sleeve-applying frame operated to apply the sleeve to the valve portion of a bag tube;

FIG. 31 is an enlarged elevational view of the front of the sleeve-applying platen on the pivoted frame;

FIG. 32 is a plan view of the driving cam and linkage for rocking the sleeve-applying frame on the carrier;

FIG. 33 is a plan view of the linkage for operating the sleeve-clamping arms and folding plates on the sleeve-applying frame during rocking movement of the latter;

FIG. 34 is a plan view of the cam and linkage for operating the valve-forming tucker;

FIG. 35 is a view similar to FIG. 31 to show the opposite side of the sleeve-holding platen and the operating means for the sleeve-clamping and folding mechanisms;

FIG. 36 is a transverse sectional view taken on line 36—36 of FIG. 35 to show the linkage for operating the sleeve-folding plates;

FIG. 37 is a sectional view taken on line 37—37 of FIG. 35 to show the linkage for operating the clamping arms to clamp the valve portion of a bag tube against the sleeve-applying platen;

FIG. 38 is a sectional view taken on line 38—38 of FIG. 35 to show the pull rod for operating the linkages illustrated in FIGS. 36 and 37;

*Apparatus in General*

The apparatus of the present invention operates on blanks in the form of single or multi-ply paper tubes T cut in predetermined lengths from a continuous web as it is delivered from a forming machine. The opposite sides of each bag tube T are infolded in the forming machine to provide gussets X and Y extending throughout the length of the tube. A portion of the wall forming one of the gussets X extends beyond the end of the remainder of the tube T to provide a valve portion V. Thus, each flat bag tube T is open at its opposite ends, infolded at its sides to provide the gussets X and Y and has a valve portion V extending from one corner.

Figure 1:
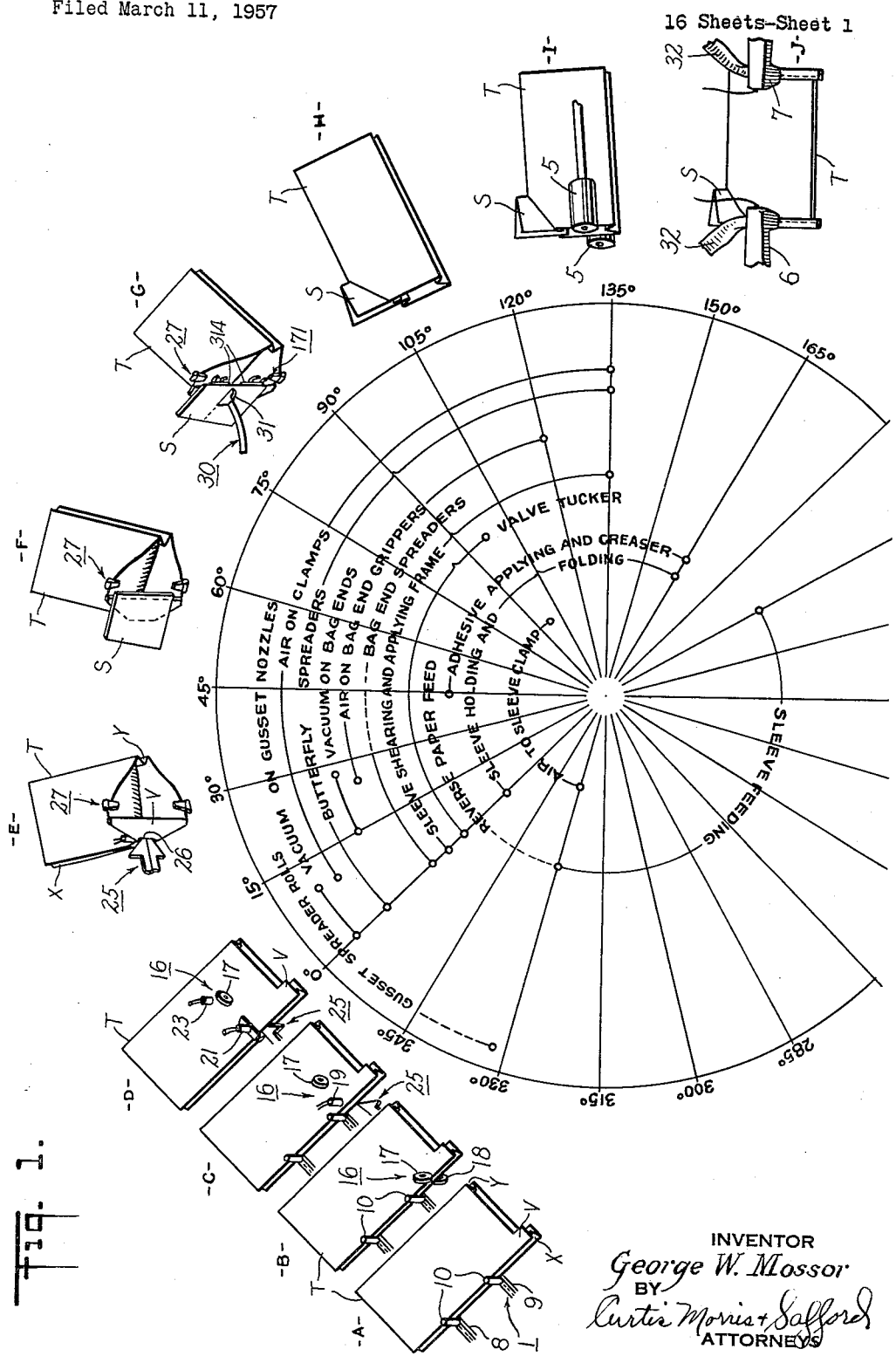
FIG. 1 is a diagrammatic view showing the series of operations automatically performed by the apparatus of the present invention to produce a sleeved valve bag.
Figure 2:
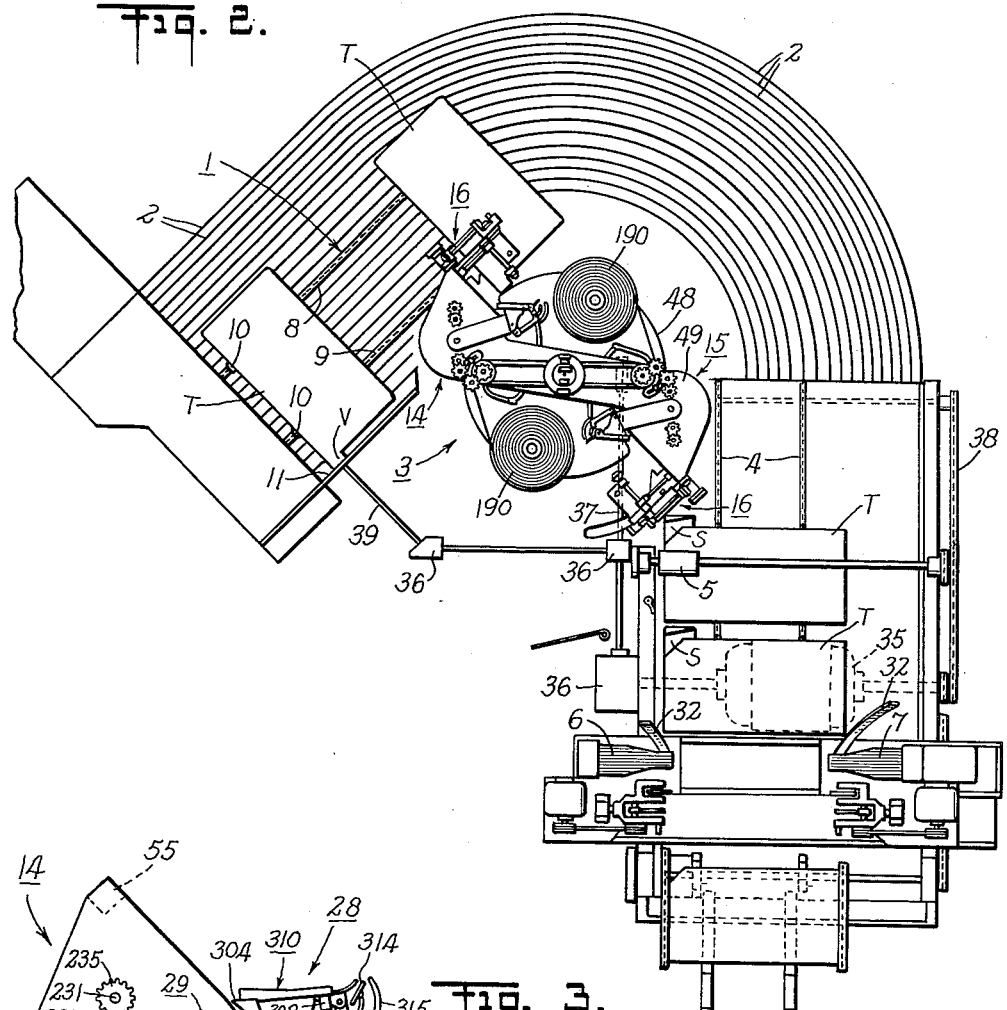
FIG. 2 is a plan view of the apparatus of the present invention and showing the rotating carrier and the conveyors for delivering bag tubes to the carrier and delivering tubes with sleeved valves formed therein from the carrier to the sewing machine heads.

In order to facilitate an understanding of the following detailed description of the apparatus, a brief summary is given of the mechanisms which operate on the bag tubes T and of the steps performed by the mechanisms at successive positions as illustrated in FIGS. 1 and 2. In general, the apparatus comprises a conveyor 1 for continuously advancing bag tubes T in succession along tracks 2 on which they slide in a linear path. A rotating carrier 3 has a head at its outer periphery which moves in an arcuate path across the linear path of conveyor 1 to intercept the bag tubes T on the conveyor 1 and move them through a circular path to a second conveyor 4. Mechanism on the carrier 3 applies a sleeve S to the valve portion V and infolds the valve portion V to form a sleeved valve. Passing rolls 5 and sewing machine heads 6 and 7 cooperate with the second conveyor 4 to flatten the sleeved valves V formed in the bag tube T and stitch the opposite ends of the bag tube to complete the bag.

Conveyor 1 is in the form of a pair of endless chains 8 and 9 having a series of spaced dogs 10 projecting upwardly therefrom for engaging the rearward side of the bag tubes T as illustrated at position A in FIG. 1. It will be noted by reference to FIG. 2 that the bag tubes T are placed on the conveyor 1 with the end of the valve portion V abutting a positioning rail 11 at the inner or right hand side of the conveyor adjacent the rotating carrier 3. The bag tubes T are then in proper position to be intercepted and transferred to the rotating carrier 3.

Rotating carrier 3 may have one or a plurality of heads mounted thereon at its outer periphery which move in a circular path intercepting the linear path of the conveyor 1. In the embodiment illustrated in FIG. 2, the carrier 3 has a pair of the heads 14 and 15 at its opposite sides. The heads 14 and 15 on the carrier 3 have a greater peripheral speed than the linear speed of conveyor 1 so that each head moves relative to a bag tube and the relative speeds are so coordinated that each head overlies a bag tube T on conveyor 1 at the same angular position of the head.

As illustrated at position B in FIG. 1, each head 14 and 15 has a bag tube intercepting mechanism 16 comprising a pair of opposed rolls 17 and 18. Rolls 17 and 18 roll over the gusset X at the rearward side of the bag tube T adjacent the valve portions V as the head advances relative to the bag tube on conveyor 1 to initially spread the folds of the gusset. Opposed suction nozzles 19 and 20 on the intercepting mechanism 16 augment the initial spreading of the folds of the gusset X and then hold the folds in their spread position as illustrated at the position C in FIG. 1. During such relative movement of head 14 or 15 and bag tube T on conveyor 1 a butterfly spreader 25 enters the gusset X between the spread apart folds as illustrated at positions C and D, in FIG. 1. Simultaneously with the seating of butterfly spreader 25 in gusset X, separate pairs of air-operated piston clamps 21, 22 and 23, 24 on the intercepting mechanism 16 engage opposite sides of the bag tube T and clamp the bag tube to the carrier 3 for rotation therewith as indicated at position D in FIG. 1. During the initial movement of the bag tube T with the carrier 3, the two wing plates of the butterfly spreader 25 are moved from their folded relationship, illustrated in positions C and D to their open or spread position illustrated in position E to spread the folds of the gusset X in to a flat plane and produce a transverse crease 26 across the gusset parallel to the end of the valve portion V.

Each head 14 and 15 also mounts a bag-end-spreader mechanism 27 for spreading the opposite sides of the end of the bag tube T to unfold the valve portion V into the flat plane of the unfolded gusset X as illustrated at position E in FIG. 1. The bag-end-spreader mechanism 27 comprises opposed grippers engaging opposite faces of the bag at its end forwardly of the gusset X and the grippers pivot about axes parallel to the end of the bag and inwardly therefrom. Such pivotal movement of grippers unfolds the valve portion V into a plane at substantially right angles to the side of the bag tube T.

A sleeve-forming and adhesive-applying mechanism 28 for each head 14 and 15 is mounted on the rotatable carrier 3. Each sleeve-forming and adhesive-applying mechanism 28 feeds and severs a length of sleeve paper from a continuous web to form a sleeve S. Mechanism 28 also creases the sleeve longitudinally to correspond to the fold of the gusset X and transversely to provide an end portion adapted to fold over the end of the valve portion V. The mechanism 28 also applies adhesive to the end portion beyond the transverse crease. Sleeve S with adhesive applied to the end portion is fed onto a platen carried by a pivoted frame 29 which transfers the sleeve S into superimposed position on the flat unfolded valve portion V as illustrated at position F in FIG. 1. Plates on frame 29 then fold the end portion of the sleeve S having adhesive applied thereto around the end of the valve portion V as illustrated at position G in FIG. 1.

After sleeve S has been applied to the valve portion of bag tube T a valve-forming mechanism 30 operates to form a valve in the bag tube T. The valve-forming mechanism comprises a tucker 31 which is moved into engagement with the unfolded valve portion V at the crease of the inner fold of gusset X as illustrated at position G to hold the fold at right angles to the side of the bag tube T. Sleeve-applying frame 29 is then withdrawn and the grippers of the bag-end-spreader 27 moved toward each other relative to the tucker 31 to fold the sleeved valve therein as illustrated at position H in FIG. 1. The piston clamps 21, 22 and 23, 24 then release the valved bag tube T which falls from the carrier 3 onto the second conveyor 4.

The second conveyor 4 moves the valved bag tubes T in a linear path away from the carrier 3 at a faster rate of speed than the head 14 or 15 to clear the latter. Conveyor 4 advances bag tubes T through the opposed pressing rolls 5 which flatten and fix the formed valves in the bag tubes T as illustrated at position I. Conveyor 4 then advances the bag tube T between the heads 6 and 7 of oppositely arranged sewing machines. Tapes 32 are fed from suitable reels which are folded over the opposite ends of the bags. The sewing machine heads 6 and 7 then stitch the tapes over the open ends of the bag tubes T and the sleeved valve portion V at one end to complete the formation of the bags as illustrated at position J.

The conveyors 1 and 4 and carrier 3 are operated by suitable driving means at speeds to coordinate their relative movement. All of the movable elements of the bag intercepting mechanism 16 bag-end-spreader mechanism 27, sleeve-forming and adhesive applying mechanism 28 and valve-forming mechanism 30 on the rotating carrier 3 are operated by the movement of the carrier relative to the stationary support on which it is mounted. With such a driving means the timed relation of the operation of the various elements in their proper sequence is assured. The carrier 3 and conveyors 1 and 4 may be operated from separate drives or from a common drive such as the motor 35 with suitable change speed gear boxes 36 as illustrated in FIG. 2. As shown in FIG. 2, the carrier 3 is driven from motor 35 by a shaft 37 and conveyor 4 is driven from motor 35 through a chain 38. Similarly conveyor 1 may be driven from motor 35 through a drive 39.

*Rotating Carrier*

As illustrated in FIGS. 4 to 6, the carrier 3 is mounted on a stationary frame 40 having a base 41 resting on a floor and a supporting plate 42 mounted on columns 43 projecting upwardly from the base. A bearing sleeve 44 extends through an opening 45 in the supporting plate 42 at right angles thereto and has an annular flange 46 overlying the top of the plate. Flange 46 is attached to the plate 42 as by welding and its upper face is finished to provide a bearing surface 47.

Carrier 3 is in the form of a turntable mounted to rotate on the cylindrical bearing sleeve 44, and has a main deck 48, an upper deck 49 and a lower deck 50. The lower deck 50 is in the form of a circular plate having an axial opening 51 therein through which the vertical bearing sleeve 44 extends and the portion of the plate surrounding the opening seats on the finished bearing surface 47 on the upper face of flange 46 for rotation thereon. Arms 56 project radially from the lower deck plate 50 at diametrically opposite sides thereof. The main deck 48 also is in the form of a generally circular plate supported above the lower deck 50 by columns 52 extending upwardly from the ends of the radial arms 56 of the lower deck. A sleeve 53 depends from the main deck plate 48 at the axis of rotation of the carrier 3, see FIG. 5. Sleeve 53 has an annular flange 54 at its upper end attached to the main deck plate 48 of the carrier 3. Sleeve 53 depends into and closely fits the interior of the bearing sleeve 44. The upper deck 49 of the turntable carrier 3 comprises a narrow generally rectangular plate having enlargements at each end, see FIG. 3, and is supported from the main deck 48 by upright columns 55 at each end. Thus, the three deck turntable carrier 3 is supported for rotation on the radial flange 46 of the bearing sleeve 44 and is held against lateral movement by its depending sleeve 53 extending into and closely fitting the interior of the bearing sleeve.

Depending sleeve 53 of carrier 3 extends beyond the bearing sleeve 44 and has a worm wheel 58 keyed thereto and retained thereon by a set screw 59, see FIG. 5. A worm 60 on shaft 37 driven from motor 35 meshes with wheel 58 to rotate the carrier turntable 3 relative to the frame 40 and bearing sleeve 44 thereon.

A hollow cylindrical shaft 61 extends upwardly from the base 41 of the frame 40 through the sleeve 53 and upper deck plate 49 of the turntable 3. Pressure and suction air lines from suitable chambers, not shown, extend upwardly through hollow shaft 61. The upper end of the hollow shaft 61 terminates in a radial flange 62, see FIG. 4, having ports to which the air and suction lines are connected. A ported valve plate 63 attached to the upper deck plate 49 for rotation therewith has air and suction lines leading to air and suction operated elements on the carrier.

It will be observed by reference to FIG. 4 that the various operating mechanisms, later to be explained in detail, are mounted on the carrier 3 between the main and upper decks 48 and 49 while the drives for the various mechanisms are mounted on the carrier between the main and lower decks 48 and 50. It will further be observed by reference to FIG. 4, that the driving linkages are operated from cams and gears on the stationary bearing sleeve 44.

*Bag-Tube-Intercepting Mechanism*

Figure 7:
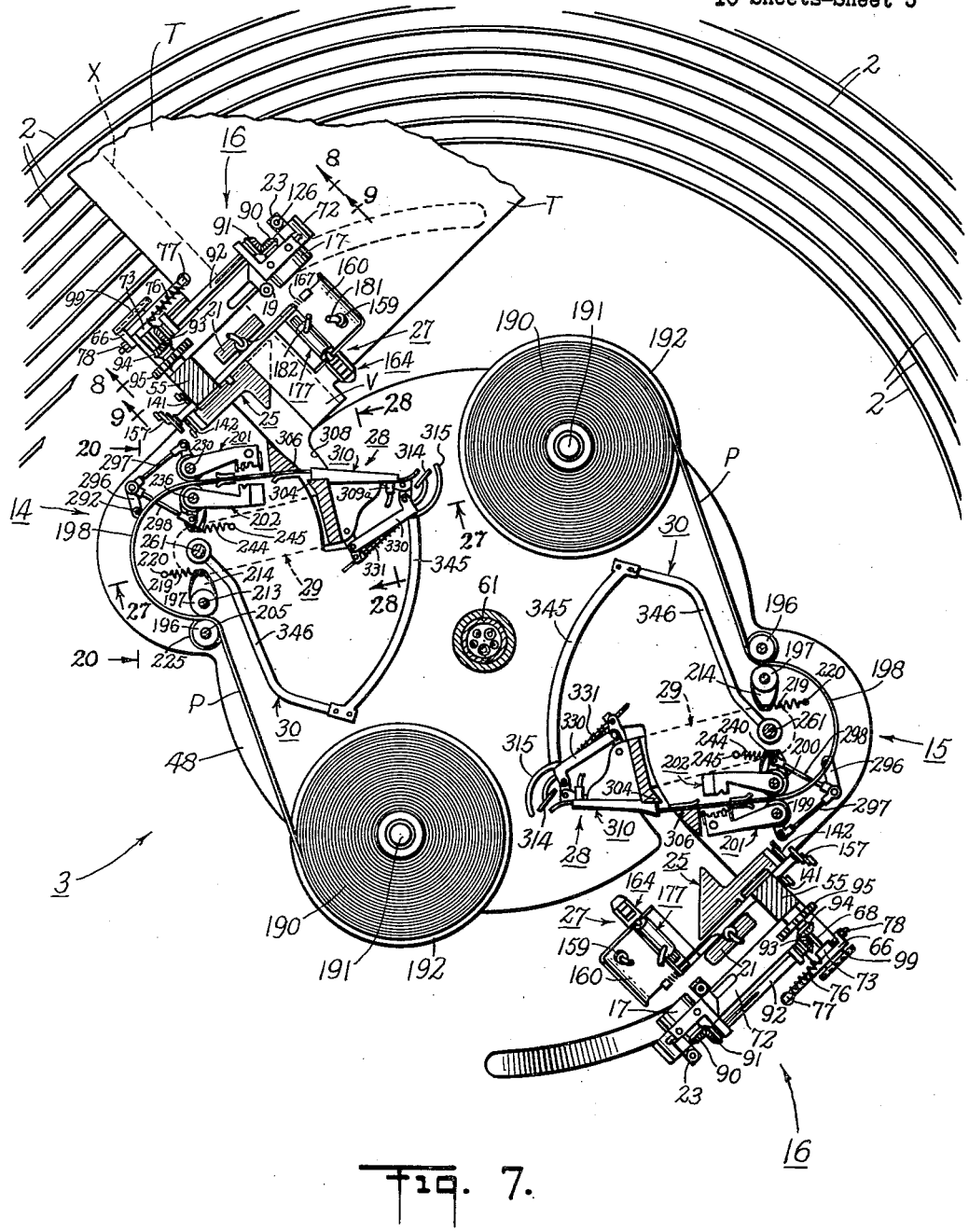
FIG. 7 is a sectional plan view of the rotating carrier taken on line 7—7 of FIG. 4 to show the operating mechanisms mounted thereon.

As illustrated in FIGS. 2, 4 and 7, the heads 14 and 15 including the bag-tube-intercepting mechanisms 16 are mounted on the carrier 3 at its outer periphery and midway between the main and upper decks 48 and 49. The intercepting mechanisms 16 of the heads 14 and 15 project outwardly beyond the deck plates 48 and 49, see FIG. 4, and forwardly therefrom, see FIG. 7. As both intercepting mechanisms 16 are identical, a description of one will suffice for the other.

Figure 10:
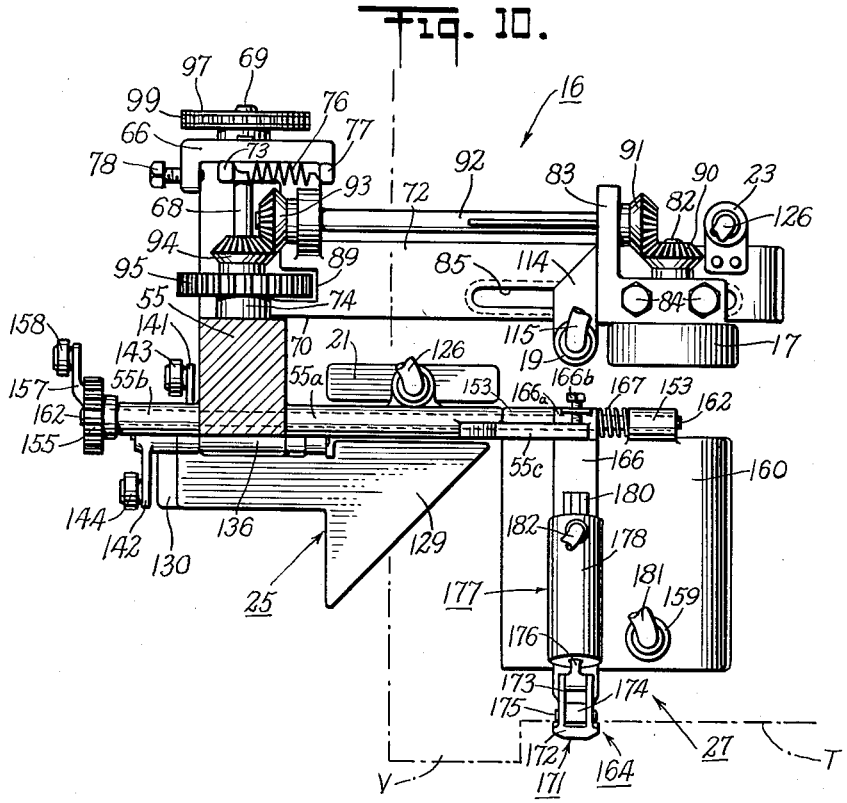
FIG. 10 is a plan view of the bag-tube-intercepting and bag-end-spreading mechanisms.
Figure 11:
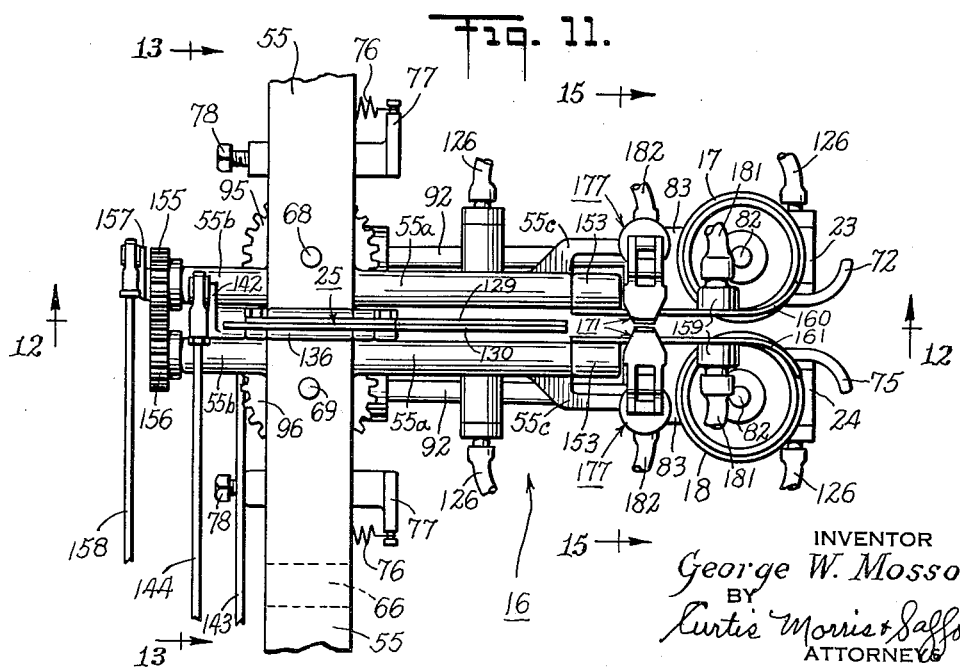
FIG. 11 is a side elevational view of the bag-end-spreading mechanism illustrated in FIG. 10.

Referring to FIG. 4, each intercepting mechanism 16 is mounted between an upright supporting column 55 and a bracket 66 attached thereto and extending outwardly and upwardly therefrom. The intercepting mechanism 16 is shown in detail in FIGS. 7 to 17 as comprising a pair of shafts 68 and 69 extending between and journaled for rotation in the column 55 and bracket 66. A pair of bell crank levers 70 and 71 are mounted to rock on the shafts 68 and 69, respectively. As shown in FIGS. 8 and 10, bell crank lever 70 is in the form of a flat plate 72, constituting one of the arms, and having bearing lugs 73 and 74 projecting upwardly from the sides thereof adjacent one end through which shaft 68 extends, see also FIG. 13. One of the bearing lugs 73 projects upwardly and constitutes the other arm of the bell crank. Lever 71 is identical with lever 70 except that it is reversed and has its flat plate 75 immediately below and spaced from plate 72 of lever 70. The arm of each bell crank 70 and 71 is biased toward the right as viewed in FIG. 8 by a spring 76 tending to rock plates 72 and 75 toward each other. Each spring 76 is connected between arm 73 and a projecting abutment 77 on the upright bracket 66. A stop 80 projecting from the bracket 66, see FIG. 8, is engaged by arm 73 of the lower bell crank lever 71 to limit the upward movement of lower roll 18 and the spring 76 for the lower lever is more resistant than the spring for the upper lever to insure the proper positioning of the rolls as they intercept a bag blank. An adjustable stop 78 is provided for each bell crank 70 and 71 for limiting the movement of lever arms 72 and 75 away from each other. Each stop 78 is in the form of a screw mounted in an offset lug projecting from the side of the bracket 66 opposite abutment 77 and in alignment with its respective arm 73.

It will be noted by reference to FIG. 8, that the outer ends of the plates 72 and 75, constituting the opposed arms of the bell cranks 70 and 71, are curved away from each other at their outer ends to receive the rearward side of a bag tube T therebetween as the intercepting mechanism 16 on the carrier 3 moves forwardly relative thereto. The opposed spreading rolls 17 and 18 are mounted to rotate on the outer ends of the arms 72 and 75 and the rolls are spring pressed into engagement with each other by the springs 76. Thus, as the intercepting means 16 moves forwardly relative to the bag tube T from the position illustrated in FIG. 8 to that illustrated in FIG. 9, the rolls 17 and 18 roll over the gusset portion X of the bag tube T which tends to spread the gusset folds to receive the butterfly spreader 25 therebetween. By reference to the plan view of the intercepting means illustrated in FIG. 10 it will be noted that the rolls 17 and 18 engage the bag tube T inwardly from the valve portion V adjacent the butterfly spreader 25.

Referring now to FIGS. 8 to 10, each roll 17 and 18 is mounted on the end of its respective shaft 82 journaled in a bearing block 83 attached to its respective arm 72 and 75 as by bolts 84. The bolts 84 extend through slots 85 extending longitudinally of the arm to adapt the bearing blocks 83 to be adjusted lengthwise of the arms. Rolls 17 and 18 are continuously rotated with a peripheral speed corresponding to the speed of the head 14 or 15 relative to the bag tube T to prevent jamming or scuffing of the bag tube. Each of the shafts 82 mounting a roll 17 or 18 is driven through bevel gears 90 and 91 from a shaft 92 which in turn, is driven from one or the other of the shafts 68 and 69 through bevel gears 93 and 94. By reference to FIGS. 11 to 13, it will be noted that the shaft 68 is driven from the shaft 69 through the intermeshing spur gears 95 and 96. It also will be observed that the plates 72 and 75 of bell cranks 70 and 71 have clearance slots 89 for gears 95 and 96. Referring back to FIGS. 10 and 13, the shaft 69 extends through the upright bracket 66 and mounts a sprocket 97. Thus, rotation of sprocket 97 operates through the shaft 69 and intermeshing spur gears 95 and 96, to drive shaft 68 and bevel gears 90 and 91 to rotate the shafts 82 mounting the rollers 17 and 18 to rotate the latter at the same peripheral speed.

Referring to FIG. 4, sprocket 97 at the end of the shaft 69 is driven from a shaft 98 through a chain 99. Shaft 98 is journaled in a bearing bracket 100 and a similar bearing on supporting column 52. The shaft 98 has a sprocket 101 in alignment with the sprocket 97 at one end and a bevel gear 102 at its opposite end. Bevel gear 102 meshes with a bevel gear 103 on a stub shaft 104 rotatably mounted in a bearing 105 on the lower deck plate 50 of the turntable carrier 3. Stub shaft 104 mounts a planetary spur gear 106 which meshes with a ring gear 107 mounted fast on the outer periphery of the stationary bearing sleeve 44. Thus, rotation of the carrier 3 relative to the stationary bearing sleeve 44 rotates the stub shaft 104. As will be observed by reference to FIG. 6, the ring gear 107 has an interrupted portion for discontinuing rotation of the gusset spreader rolls 17 and 18 when the bag tube T is released from the carrier 3.

The spreading of the folds of the gusset X by the rolls 17 and 18 is augmented by the opposed suction nozzles 19 and 20 mounted on the arms 72 and 75 which tend to further separate the gusset folds during the relative movement of the intercepting means and bag tube T. Referring back to FIGS. 9 and 10, it will be observed that each suction nozzle 19 and 20 is mounted on a bracket 114, which, in turn, is attached to the bearing block 83 on the respective arm 72 or 75 of the bell crank 70 or 71. Each of the suction nozzles 19 and 20 at opposite sides of the bag tube T is connected through a flexible hose line 115 to a port in the valve plate 63 rotatable with the carrier 3, see FIG. 4, which, in turn, is connected through a stationary line extending through the hollow column 61 to a chamber maintained below atmospheric pressure, not shown. The application of suction to the nozzles 19 and 20 is controlled by a valve 116 on the supporting plate 42 of the frame 40, see FIG. 4, and operated by a cam 117 adjustably mounted on the deck plate 50 of the rotatable turntable 3.

After the head 14 or 15 has moved relative to the bag tube T on the conveyor 1 until the butterfly spreader 25 is properly positioned in the gusset X, the bag tube is clamped to the head by the opposed pairs of piston operated clamps 21, 22 and 23, 24 for movement therewith. As illustrated in FIGS. 9 and 10, the opposed pair of clamps 21 and 22 are mounted on bearing bosses 55a projecting from one side of the column 55 adjacent the side of the arms 72 and 75. Thus, the clamps 21 and 22 are positioned to engage the rearward edge of a bag tube T outwardly from the valve end V and the butterfly spreader 25, see FIG. 10. As shown in FIG. 9, each clamp 21 and 22 comprises an air cylinder 121 having a piston 122 therein normally held in its retracted position by a spring 123 and movable against the action of the spring by air pressure applied to the head end of the piston. Piston 122 is connected to a clamping plate 124 by a piston rod 125. Thus, when air is applied to the pistons 122, the clamping plates 124 are actuated into engagement with the opposite sides of the bag tube T.

Piston clamps 23 and 24 are of identical construction with the piston clamps 21 and 22 and are mounted on the outer ends of the arms 72 and 75 of the bell cranks 70 and 71, respectively. As shown in FIG. 10, the clamps 23 and 24 are mounted on the arms 72 and 75 at their forward ends and outwardly from the axis of the carrier 3 to engage the bag tube T at a point forwardly and outwardly from the clamps 21 and 22. When the clamps 23 and 24 are actuated into engagement with the bag tube T, they rock the arms 72 and 75 on the shafts 68 and 69 on which they are mounted against the action of the tension springs 76 to disengage the rolls 17 and 18 from the bag tube. The rocking movement of the arms 72 and 75 is limited by the engagement of the arms 73 with the stops 78 so that the clamps 23 and 24 operate against fixed abutments to tightly clamp the bag tube T to the carrier.

Pistons 122 of the clamps 21, 22 and 23, 24 are operated by air under pressure which is fed to the cylinders 121 through air line 126 from the ported valve plates 63, see FIG. 4. Actuation of the clamps 21, 22 and 23, 24 is controlled by an air valve 127 on the frame 40 and actuated by an adjustable cam 128 on the lower deck plate 50 of the carrier 3 to clamp the bag tube T to the carrier at a predetermined angular position of the head 14 or 15.

Thus, the intercepting mechanism 16 moves relative to the bag tube T, see FIGS. 8 and 9, and operates to initially spread the folds of the gusset X, move the butterfly spreader 25 into the gusset and thereafter clamp the bag tube to the carrier for movement therewith.

*Gusset and Bag-End-Spreaders*

When a bag tube T has been clamped to a head 14 or 15, the butterfly spreader 25 is operated to unfold the gusset X into a flat plane and produce the transverse crease 26 and the bag-end-spreaders 27 unfold the valve portion V into the plane of the unfolded gusset to receive a sleeve S, as previously explained with respect to position E in FIG. 1.

The butterfly spreader 25 and operating means therefor is shown in detail in FIGS. 10 to 14. Butterfly spreader 25 comprises upper and lower plates 129 and 130 folded into closely adjacent overlying relationship in their closed position. Each plate 129 and 130 has a triangular shaped forward end 131 in the form of a wing, which enters the gusset fold X and a rearwardly extending rectangular portion 132. Plate 129 has spaced bearing hubs 133 and 134 projecting from one side thereof while plate 130 has spaced bearing hubs 139 and 140 offset with respect to hubs 133 and 134. It will be noted by reference to FIG. 10, that one edge of the triangular shaped wing of 131 of each plate 129 and 130 is substantially coaxial with its bearing hubs 133, 134 and 139, 140. Plates 129 and 130 are pivotally mounted on the opposite projecting ends of a pin 135 mounted in a bracket 136 on the inner side of column 55 between the main and upper deck plates 48 and 49. The ends of the pin 135 project through the aligned and interleaved bearing hubs 133, 134, 139 and 140 of the wing plates 129 and 130 to provide a piano hinge.

Plates 129 and 130 of the buttefly spreader 25 are rocked toward and away from each other by crank arms 141 and 142 which project upwardly and outwardly from the bearing hubs 134 and 140 at opposite sides of a vertical plane, see FIG. 13. Connecting rods 143 and 144 connect crank pins at the end of the crank arms 141 and 142 to one arm of a bell crank 145 mounted to rock on the column 55. Thus, when the bell crank 145 is in the position illustrated in FIG. 13, the upper and lower plates 129 and 130 are rocked toward each other to their closed position illustrated in FIGS. 8, 9 and 13. When the bell crank 145 is rocked clockwise from the position illustrated in FIG. 13, the connecting rods 143 and 144 rock the crank arms 141 and 142 and the upper and lower plates 129 and 130 away from each other to the open position illustrated in FIG. 14. The triangular wings 131 of the upper and lower plates 129 and 130 spread the opposite folds of the gusset X into a common plane inwardly of and adjacent to the opposed clamps 21 and 22. Furthermore, such spreading of the folds of gusset X into a common plane produces the crease line 26 adjacent the triangular wings 131.

Figure 21:
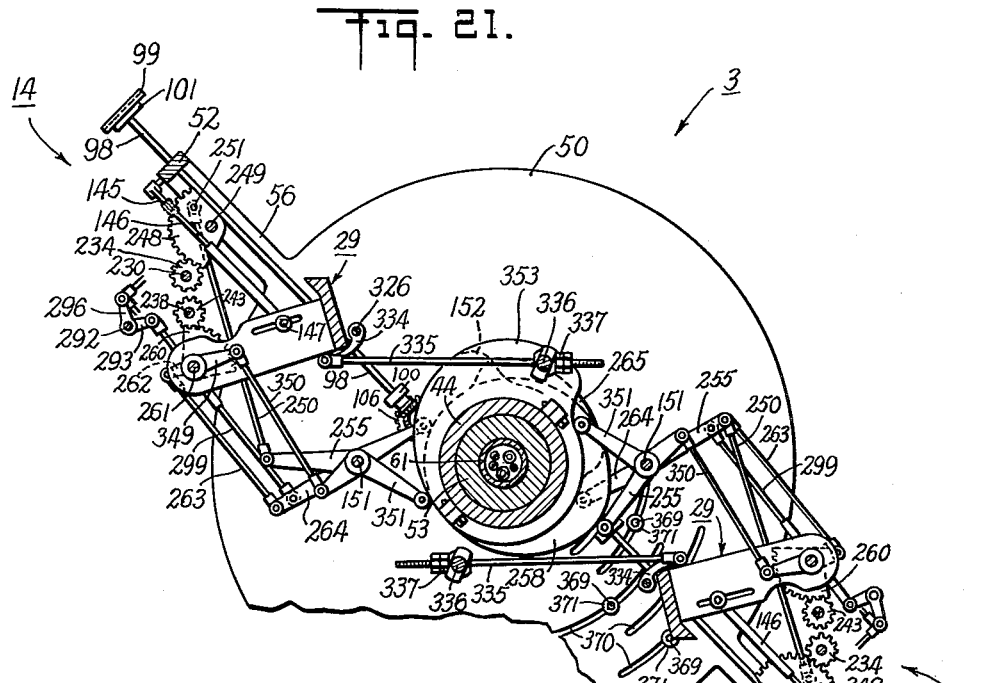
FIG. 21 is a sectional view taken on line 21—21 of FIG. 4 to show the means for driving the various movable parts of the sleeve-forming and -applying mechanism in timed sequence.

As illustrated in FIG. 13, bell crank 145 is actuated by a rod 146. Referring to FIGS. 4 and 21, the opposite end of the rod 146 is adjustably connected at 147 to one arm of the sleeve applying frame 29, later to be described in detail. Frame 29, in turn, is actuated by a push rod 149 from a bell crank 150, see FIG. 32 mounted on a bracket 151 depending from the main deck 48 of the carrier 3, see FIG. 4. Bell crank 150 is a cam follower having one arm engaging a cam track 152 on the stationary bearing sleeve 44 of the frame 40. Thus, the upper and lower wings 131 of the butterfly spreader 25 are simultaneously rocked from the closed position illustrated in FIG. 11 to the open position illustrated in FIG. 14 during a particular increment of angular movement of the rotating carrier 3 relative to the cam 152 on the frame 40.

The bag-end-spreader 27 on each head 14 and 15 is shown in detail in FIGS. 10 to 19, and comprises a pair of opposed plates 160 and 161 positioned inwardly of the spreader rolls 17 and 18 towards the axis of rotation of the carrier 3. As shown most clearly in FIGS. 10 and 13, the plates 160 and 161 are carried at the forward end of rock shafts 162 and 163, respectively. Each plate 160 and 161 has a suction nozzle 159 adjacent its inner edge adapted to overlie a side of a bag tube T adjacent its open end and spaced bearing hubs 153 projecting from the outer edge thereof through which the forward end of shaft 162 or 163 extends. The hubs 153 of each plate 160 and 161 are attached to their respective shaft 162 or 163 by suitable fastening means 154 such as set screws. The shafts 162 and 163, in turn, are journaled to rock in the column 55 for supporting the upper deck 45 and bearing bosses 55a and 55b projecting from each side thereof. Rock shafts 162 and 163 project beyond their bearing boss 55b and have gears 155 and 156, respectively, mounted fast on their projecting ends. Gears 155 and 156 intermesh so that oscillation of one gear 155, its shaft 162 and bag-end-spreader plate 160 in a counterclockwise direction as viewed in FIG. 13 will cause gear 156, its shaft 163 and bag-end-spreader plate 161 to rock in a clockwise direction, or away from plate 160. A crank arm 157 projects from the hub of gear 155 and is connected to the bell crank 145 by a connecting rod 158.

A pair of bag-end-grippers 164 and 165 overlie the plates 160 and 161 of the bag-end-spreader 27. As shown in FIG. 15, each bag-end-gripper 164 and 165 comprises a base plate 166 having a bearing hub 166a at its outer end located between the spaced bearing hubs 153 of its respective bag-end-spreader plate 160 or 161. As shown in FIG. 12, coiled torsion springs 167 surround shafts 162 and 163. Each torsion spring 167 has its ends bearing against lugs 168 and 169 projecting from the bearing hubs 153 and 167 which tends to rock its gripper 164 or 165 toward the bag-end-spreader plates 160 or 161, respectively. The base plate 166 of each bag-end-gripper 164 and 165 projects beyond the bearing hub 166a and is projected upwardly to receive a set screw 166b constituting an abutment for engagement with a stop 55c extending from the bearing boss on column 55. The adjustable abutments 166a limit the rocking movement of the bag-end-grippers 164 and 165 toward each other to hold them spaced from the bag-end-spreader plates 160 and 161 in their initial position illustrated in FIG. 13.

Also as shown in FIG. 15, each bag-end-gripper 164 and 165 comprises a gripping element 171 pivotally mounted intermediate its ends adjacent the inner end of the base plate 166. One end of the pivoted gripping element 171 constitutes a gripping finger 172 while the opposite end 173 is bifurcated to straddle a bearing bracket 174 projecting from base plate 166 and carrying a pivot pin 175. The bifurcated end 173 of the gripping element 171 is actuated by the piston rod 176 of an air operated motor 177 and connected thereto by a suitable wrist pin. Air operated motor 177 comprises a cylinder 178 having a piston 179 movable therein. The head end of the cylinder 178 is pivotally mounted in spaced clevice cleats 180 on the base plate 166 to adapt the cylinder to rock and compensate for the angular movement of the gripping element 171.

Suction lines 181, see FIG. 10, are connected to the suction nozzles 159 while air pressure lines 182 are connected to the head end of the cylinders 178 of each bag-end-gripper element 164 and 165. Each of the air suction lines 181 and air pressure lines 182 are connected to the ported valve plate 63 rotatable with the carrier 3. Corresponding air suction and air pressure lines 181 and 182 are connected to the ported radial flange 62 in the stationary column and are connected to and controlled by valves 183 and 184 on the stationary frame 40, see FIG. 4, which, in turn, are actuated by cams 185 and 186 depending from the deck plate 50. Thus, at a particular position of the head 14 or 15, the valves 183 and 184 are actuated to apply suction to the suction nozzles 159 on the opposed plates 160 and 161 and air pressure to the cylinders 178 of the bag-end-spreaders 27. The suction nozzles 159 draw the opposite sides of the bag end apart in position to be gripped by the fingers 172 after which the fingers are actuated to grip the opposite sides of the bag end.

After the opposite sides of the bag tube T are spread by the suction nozzles 159 and gripped by the bag-end-grippers 164 and 165, the cam 152 on the stationary bearing sleeve 44 actuates the bell crank followers 150 and operates through the connecting linkage to rock the shafts 162 and 163 and opposed plates 160 and 161 mounted fast thereon from the position illustrated in FIG. 15 to that illustrated in FIG. 18. During such rocking movement, the opposed plates 160 and 161 engage and rock the bag-end-grippers 164 and 165 with the bag ends gripped thereto to unfold the valve portion V into the plane of the unfolded gusset X and inwardly at substantially right angles to the gusseted side of the bag as shown in FIG. 19. The valve portion V of the bag tube T is then in condition to receive a sleeve S. After a sleeve S is applied to the valve portion V of a bag tube T the plates 160 and 161 of the bag-end-spreader 27 are rocked toward each other to return them to their initial position. The bag-end-grippers 164 and 165 mounted loosely on shafts 162 and 163 return with plates 160 and 161 connected thereto by the torsion springs 167 until the abutments 166a engage the stops 55c to space the grippers from the plates in their initial position as shown in FIG. 13.

*Sleeve-Forming Mechanism*

The sleeve-forming and applying mechanism 28 is shown in detail in FIGS. 2, 3, 4, 7 and 20 to 23 and is similar to that described and claimed in my prior application Serial No. 295,673 referred to above. The mechanism 28 feeds a length of paper corresponding to the length of a sleeve S from a continuous web of paper P. As shown in FIGS. 2, 4 and 7, the webs of sleeve paper P for the heads 14 and 15 are wound into rolls 190 and mounted on spindles 191 projecting upwardly from the main deck 48 at each side of the upper deck plate 49. As the sleeve feeding mechanism for the head 14 and 15 are identical, a description of one will suffice.

As shown in FIG. 4, each roll of sleeve paper 190 is mounted on a supporting plate 192 having a depending collar 193 surrounding the spindle with an angular slot 194 therein. Supporting plate 192 is locked in position on the spindle 191 by a set screw 195 extending through the slot 194 and screwed into a tapped hole in the spindle. By loosening the set screw 195 and turning the supporting plate 192 the vertical position of the paper roll 190 may be adjusted.

Referring now to FIG. 7, it will be observed that the web of paper P extends from the roll 190 through the bight of a pair of continuously operating feed rolls 196 and 197 to form a loop 198 and then from the loop through the bight of another pair of intermittently operated feed rolls 199 and 200. From the rolls 199 and 200, the paper extends between the jaws 201 and 202 of the crease-forming and adhesive-applying mechanism, and then through a guide slot 203 to the pivoted frame 29.

Referring to FIG. 20, the continuously operated feed rolls 196 and 197 are shown mounted for rotation about vertical axes between the main and upper deck plates 48 and 49. Feed roll 196 has shaft extensions 204 and 205 at its opposite ends which project through bearings 206 and 207 in the main and upper decks 48 and 49, respectively. The upper shaft extension 205 mounts a driven gear 208 and a driving gear 209. Feed roll 197 has shaft extensions 212 and 213 at its opposite ends for rotation in bearing trunnions 215 and 216 at the end portions of a yoke frame 214 mounted to rock about a vertical axis. Bearing trunnions 215 and 216 project from the opposite ends of the yoke frame 214 and are eccentric with respect to the shaft extensions 212 and 213 of the feed roll 197. Trunnions 215 and 216 are journaled in bearings 217 and 218 in the main and upper deck plates 48 and 49. Tension springs 219 act between the upright bar of the yoke frame 214 and stationary lugs 220 on the main and upper deck plates 48 and 49, see FIGS. 4 and 7. Thus, the springs 219 rock the yoke frame 214 to yieldingly press the feed roll 197 eccentrically mounted therein toward the feed roll 196. Shaft extension 213 projects beyond the eccentric trunnion 215 and mounts a spur gear 221 which meshes with the driving gear 209 on shaft extension 205 of feed roll 196.

Figure 3:
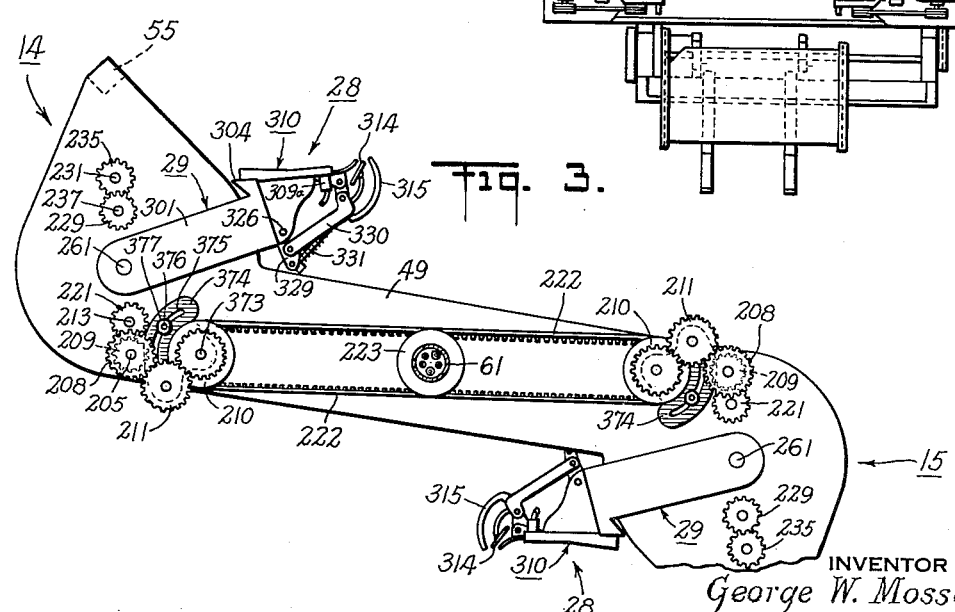
FIG. 3 is an enlarged plan view of the upper deck of the rotating carrier and showing the interchangeable gearing for driving the continuously operating feed rolls to feed sleeve paper.

As shown in FIGS. 3 and 4, the feed rolls 196 and 197 are continuously driven by a toothed belt 222 acting between a stationary ring gear 223 on the periphery of the stationary hollow column 61 about which the carrier 3 rotates and a driven gear 210. Driven gear 210 meshes with an interchangeable idler gear 211, which, in turn, meshes with driven gear 208 on the shaft extension 205 of feed roll 196. Thus, as the carrier 3 rotates on the stationary frame 40, the planatary movement of the shaft extension 205 in a circular orbit with respect to the axial column 61 causes the toothed belt 222 to rotate the driven gear 208 to rotate the feed roll 196. Rotation of the shaft extension 205 of feed roll 196 is transmitted through the intermeshing gears 209 and 221 to simultaneously rotate the feed rolls 196 and 197.

Feed roll 197 has an annular groove 224 intermediate its ends while the feed roll 196 has a projecting rib 225 cooperating with the annular groove. Thus, a web of the paper P fed between the feed rolls 196 and 197 is scored longitudinally to provide a crease 226 about which a sleeve S of the paper will fold to fit in the crotch of the folded valve portion V.

The intermittently operated feed rolls 199 and 200 are similar to the rolls 196 and 197. Feed roll 199 has shaft extensions 230 and 231 projecting through bearings 232 and 233 in the main and upper deck plates 48 and 49, respectively. Shaft extension 230 mounts a driving gear 234 at its lower end and shaft extension 231 mounts a driven spur gear 235 at its upper end. Feed roll 200 has shaft extensions 236 and 237 which are mounted eccentrically in trunnions 238 and 239 of a yoke frame 240 similar to the yoke frame 214. Shaft extension 237 extends beyond the trunnion 239 and mounts a spur gear 229 which meshes with the spur gear 235 on feed roll 199. The trunnions 238 and 239 are journaled in bearings 241 and 242 in the main and upper deck plates 48 and 49, respectively. Trunnion 238 depends below the main deck 48 and has a gear 243 at its lower end. Springs 244 are connected between the upright bar of the yoke frame 240 and lugs 245 and 246 on the main and upper deck plates 48 and 49 which tend to rock the frame in its trunnions 238 and 239 and yieldingly engage the eccentrically mounted feed roll 200 with the feed roll 199.

Referring to FIGS. 4, 20 and 21, feed roll 199 is driven by a segment gear 248 mounted to rotate on a stub shaft 249 depending from the main deck 48 of carrier 3. The segment gear 248 meshes with the gear 234 on the depending shaft extension 230 and is oscillated by a driving mechanism having a connecting rod 250 connected between a crank pin 251 depending from the segment gear and one arm of a lever 255, see FIG. 23, pivotally mounted on shaft 151 depending from the main deck plate 48 of carrier 3. The opposite arm of the lever 255 has a follower roll 257 engaging a cam 258 on the stationary bearing sleeve 44. Thus, rotation of the carrier 3 relative to the stationary bearing sleeve 44 causes the follower roll 257 and lever 255 to rock on its pivot as it moves relative to the cam 258 and acting through the connecting rod 250, oscillates the segment gear 248. Oscillation of the segment gear 248 is transmitted through the gear 234 to rotate the feed roll 199. Rotation of the feed roll 199 is transmitted through the intermeshing spur gears 235 and 229 to rotate the feed roll 200. Lever 255 is rocked in the opposite direction by a spring 259 to maintain the follower 257 engaged with cam 258.

Figure 22:
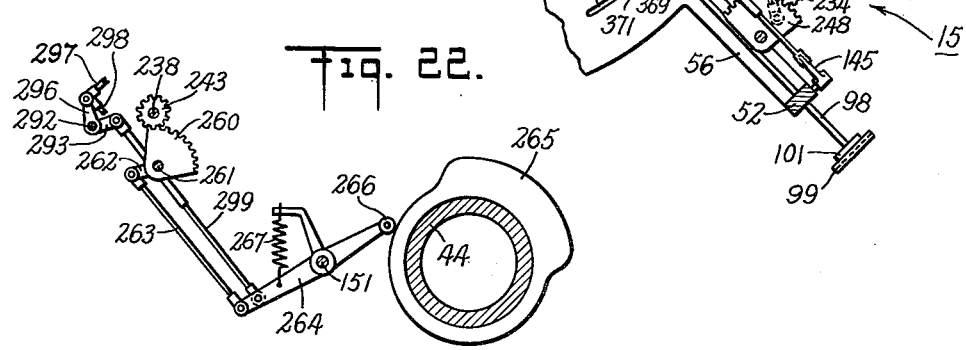
FIG. 22 is a plan view of the cam and linkage for controlling the operation of the intermittent feed rolls.

Operation of the intermittent feed rolls 199 and 200 to feed the web of paper P, however, is controlled by the position of the eccentric trunnions 238 and 239 of the yoke frame 240. As shown in FIG. 20 to 22, a segment gear 260 meshes with gear 243 on the depending eccentric trunnion 238 to rotate the yoke frame 240 and thereby move the feed roll 200 away from the feed roll 199. Segment gear 260 is mounted on a shaft extension 261 depending below the main deck plate 48 and has a crank arm 262. Segment gear 260 is oscillated by a connecting rod 263 connected to one end of a lever 264 mounted to rock on the main deck plate 48. The opposite end of the lever 264 has a follower 266 engaging a cam 265 on the bearing sleeve 44. As shown in FIG. 22, a spring 267 acts between the lever 264 and an abutment to hold the follower 266 engaged with cam 265.

Yoke frame 240 is yieldingly rocked to the position illustrated in FIG. 20 by the springs 244 during rotation of the carrier 3 until the follower 266 of lever 264 engages the lobe of cam 265 which rocks the lever counterclockwise as viewed in FIG. 22 and, in turn, rocks the segment gear 260. Rocking of segment gear 260 acts through gear 243 to rock the yoke frame 240 and thereby disengage feed roll 200 eccentrically mounted therein from the feed roll 199.

It will be observed from the above that the segment gear 248 oscillates so as to drive the feed roll 199 in opposite directions. In one of these directions the feed roll advances the web of sleeve paper P. When the segment gear 248 oscillates in the opposite direction, segment gear 260 rocks yoke frame 240 to disengage the feed roll 200 from the feed roll 199. However, the cams 258 and 265 are so arranged as to engage the feed rolls 199 and 200 during a short portion of the reverse movement of segment gear 248 after a sleeve S has been cut from the web to withdraw the end of the web for an adhesive-applying and transverse-creasing operation. More specifically, cam 258 operates feed rolls 199 and 200 in one direction through a forward sleeve advancing stroke and then through a rearward idle stroke and cam 265 controls the engagement of rolls to feed paper forwardly or rearwardly. Cam 265 engages rolls 199 and 200 during a forward sleeve advancing and severing operation and during a short portion only of the reverse stroke to withdraw the end of the web P to apply adhesive thereto.

*Adhesive-Applying Mechanism*

The transverse-creasing and adhesive-applying mechanism is shown in detail in FIGS. 7, 24, 25 and 26 as comprising the opposed clamping jaws 201 and 202 between which the web of paper P feeds, as previously explained. As shown in FIGS. 24 and 25, the jaws 201 and 202 comprise opposed vertical bars 268 and 269 extending throughout the width of the paper web P. Bar 268 has horizontal arms 270, 271 at each end while bar 269 has horizontal arms at 272, 273 projecting from its ends. The inner ends of arms 270 and 271 of jaw 201 have bearing hubs mounted to rock on the shaft extensions 230 and 231 of the feed roll 199 while the inner ends of arms 272 and 273 of jaw 202 have bearing hubs mounted to rock on the shaft extensions 236 and 237 of the feed roll 200.

Vertical bar 268 of jaw 201 has a bore 276 extending throughout its length with a series of transverse perforations 277 extending from its inner face to the longitudinal bore. The bottom end of the bore 276 is closed and the upper end is connected by a flexible connection 278 through which an adhesive is fed to the bore from a suitable supply. The inner face of the bar 268 has a recess 280, see FIG. 24, extending from opposite sides of the perforations 277 to limit the spread of adhesive.

A creasing rib 281 is provided on jaw 201 at the rear of the adhesive-applying recess 280, and extends throughout the entire length of the vertical bar 268. Between the recess 280 and the creasing rib 281 is a second recess 282 to further prevent the flow of any adhesive to the creasing rib. Jaw 202 has a detachable anvil 283 projecting forwardly to overlie the perforations 277 in the bar 268 and a groove 284 opposite the creasing rib 281. Thus, when the jaws 201 and 202 are moved toward each other, they clamp the web of paper P therebetween to apply a band of adhesive across the web and form a transverse crease 291 at the rear of the adhesive band.

Plates 285 and 286 are adjustably mounted on the end of the jaw 201, see FIGS. 24 and 26, and each plate has a projection 287 for engaging the paper web adjacent each end of the anvil 283. Each plate 285 and 286 has a slot 288 through which attaching screws 289 extend to clamp the plate to the end of the jaw 201 while permitting adjustment toward and away from each other for webs of paper P of different widths. The anvil 283 is detachably mounted on the jaw 202 to adapt it to be changed for paper of different width, and the anvil is of less width than the paper so that the projections 287 on plates 285 and 286 deflect the sides of the paper away from the adhesive-applying face of bar 268 at opposite ends of anvil 283 to limit the band of adhesive to the center portion of the web P.

Underlying the bar 268 of the jaw 201 in a recess in the main deck 48 is a well 290 to receive surplus adhesive flowing down the channel 280 during operation of the machine and draining the bore 276 and perforations 277 when the machine is stopped. The adhesive is returned from the well 290 to the bore 276 at the top of the bar 268 through the flexible tube 278 by means of a pump, not shown.

The jaws 201 and 202 are rocked toward and away from each other on the shaft extensions 231, 232 and 236, 237 of feed rolls 199 and 200, respectively, see FIG. 20, in timed relation with the feeding rolls by driving mechanism operated by rotation of the carrier 3 relative to the bearing sleeve 44. As shown in FIGS. 24 and 25, the lower bearing hubs of the jaws 201 and 202 have radially projecting arms 294 and 295 connected to one end of a lever arm 296 by connecting rods 297 and 298. Lever arm 296 projects from the upper end of a shaft 292 journaled in the main deck plate 48. A lever arm 293 projects from the lower end of shaft 292 and is connected by a rod to the lever 264, see FIG. 21, for operating the trunnion 238 for controlling engagement of the intermittent feed rolls 199 and 200. It will be noted, however, by reference to FIG. 21 that when the segment gear 260 is in position to engage the feed rolls 199 and 200, the connecting rod 299 moves the jaws 201 and 202 away from each other. During the return movement of the segment gear 260 to disengage feed roll 200 from the feed roll 199, the connecting rod 299 operates the jaws toward each other to apply adhesive and form the transverse crease 291 in the web.

*Sleeve-Applying Mechanism*

The sleeve-applying mechanism is generally similar to that described and claimed in my prior application Serial No. 295,673, referred to above, and is shown in detail in FIGS. 3, 4, 7, and 27 to 40. As shown in FIGS. 4, 27 and 28, the frame 29 is of generally C-shaped form and pivotally mounted for rocking movement about a vertical axis. Frame 29 has an upright bar 300 with parallel arms 301 and 302 at each end. Arm 301 overlies the upper deck plate 49 while arm 302 is located below the main deck 48. The ends of the arms 301 and 302 are pivotally mounted on the through shaft 261 extending vertically through the main and upper decks. The forward inner edge of the upright bar 300 is formed to provide a knife edge 304 which is spaced from an upright shearing bar 305 extending between the main and upper deck and having a cooperating knife edge 306, see FIGS. 29 and 30. Mounted on the side of the stationary shearing bar 305 adjacent the shearing edge 306, is the guide plate 203, see FIG. 24, which directs the web of paper P advanced by the intermittently operated feed rolls 199 and 200 between the shearing edges 304 and 306. As shown in FIG. 7, the main deck plate 48 is so shaped as to accommodate the upright shearing bar 305 and the main deck plate has an arcuate slot 308 to accommodate the bar. The upright bar 300 of rocking frame 29 is of tapered form from the top to the bottom to provide the knife edge 304 at an angle to the sides of the paper web P and the stationary shearing bar 305 has a corresponding inclined knife edge 306 to cut a length of the sleeve paper P on a bias, see FIG. 27. This is for the purpose of facilitating the separation of the ends of the valve sleeve S for the insertion of a filling nozzle after the bag has been completed.

A sleeve-supporting platen 310 is bolted to the outer side of the upright bar 300, see FIGS. 36 and 37. As shown in FIG. 31, the sleeve-supporting platen 310 is in the form of a plate having sleeve guides 311 and 312 at its sides and a slot 313 located midway between the sides. The band of adhesive on the end of the paper web P does not extend to the guides 311 and 312, as previously explained, to avoid clogging of the guides or interference with the movement of the paper onto the platen. Thus, the web of sleeve paper P is advanced by the intermittent feed rolls 199 and 200 through the guides 203 and between the knife edges 304 and 306 onto the supporting platen 310 with the sides of the sleeve sliding freely in guides 311 and 312. The web of sleeve paper P is clamped to one of the sleeve guides 311 by a pin 309 extending through the platen 310 and operated by air motor 309a mounted on the rearward side of the platen, see FIG. 35. The supply of air to motor 309a is controlled by a valve 324 mounted on the stationary supporting frame 40, see FIG. 4 and operated by a cam 325.

Also mounted on the rearward side of the platen 310 at each side of slot 313 is a sleeve folding plate 314 and clamping arm 315, see FIGS. 35 to 38. As shown in FIGS. 35 and 36, each folding plate 314 is adapted to rock to fold the end of a sleeve S on platen 310 over the end of the valve portion V and is mounted on a pair of spaced curved arms 316 and 317. Arms 316 and 317, in turn, project from the ends of crank arms 319 and 320 mounted fast on a rock shaft 318 journaled in bearings projecting rearwardly from the platen 310. Each clamping arm 315, see FIG. 37, is of arcuate form and projects from a crank arm 323 mounted to rock on shaft 318 as a pivot. Clamping arms 315 are adapted to clamp the spread valve portion V of the bag tube T against the platen 310 while the end of the sleeve S is being folded.

The folding plates 314 and clamping arms 315 are actuated simultaneously from a rock shaft 326 mounted in bearings 327 on the rearward face of the sleeve supporting platen 310 and held in position thereon by collars 328. Rock shaft 326 has crank arms 329 connected by connecting rods 330 to crank arms 319 on rock shaft 318 so that rocking movement of shaft 326 rocks the arms 316 and 317 and folding plates 314 thereon. A second connecting rod 331 extends from each crank arm 329 to the crank arms 323 to rock the clamping arms 315 extending therefrom. It will be noted by reference to FIG. 36 that connecting rod 330 is connected to crank arm 329 closer to its pivotal axis than connecting rod 331 so that clamping arm 315 is actuated at a faster rate than and engages the paper before the folding plate 314 folds the end of the paper. Each crank arm 329 is connected to its connecting rod 331 through a swivel connection 332 which transmits motion to the connecting rod through a spring 333. With this construction the clamping arms are moved into engagement with the sleeve on the platen 310 and continued movement of the rock shaft 326 permits relative movement between the parts.

Rock shaft 326 is operated by the relative movement of the frame 29 and the carrier 3. As illustrated most clearly in FIGS. 35 and 38, the rock shaft 326 has a curved crank arm 334 projecting to the rear of the frame 29 and a connecting rod 335 connecting the end of the crank arm to a stationary abutment 336 depending from the main deck plate 48, see FIGS. 4 and 33. As will be observed from FIG. 4, the end of the connecting rod 335 is threaded to receive an adjusting nut 337 to adjust the position at which the nut engages the abutment and the angular position of the frame 29 at which the clamping arms 315 and folding plates 314 are operated. Thus, when the frame 29 is rocked from its sleeve-receiving to its sleeve-applying position, the rock shaft 326 is rocked from the position illustrative in full lines to that illustrated in dotted lines in FIG. 33.

As shown in FIG. 32, frame 29 is rocked from its sleeve-receiving position to its sleeve applying position by the movement of the carrier 3 relative to the stationary bearing sleeve 44. As previously described with respect to the operating means for actuating plates 129 and 130 of the butterfly spreader 25, a stationary cam 152 on bearing sleeve 44 actuates a bell crank 150 as the latter moves with carrier 3 relative to the cam. The opposite arm of the bell crank 150 is connected to the lower arm 302 of the frame 29 by a connecting rod 149. Thus, as bell crank 150 is moved relative to the cam 152 the frame 29 is rocked on shaft 261 from the position shown in FIG. 29 to that shown in FIG. 30 to apply the sleeve to the unfolded valve portion V of the bag tube T. Bell crank follower 150 is rocked in the other direction by a spring 343 to return the frame 29 to its original position.

The valve-forming tucker arm 31 moves with the frame 29 to apply a sleeve S to the bag tube T and holds the center portion of the valve V while the bag end grippers 170 are actuated toward each other to form the valve. The valve-forming tucker arm 31 is shown in detail in FIGS. 7, 20 and 34. As shown in FIGS. 7 and 34, the tucker arm 31 has an arcuate arm 345 movable in the slot 313 in the sleeve platen 310, see FIG. 31. The arcuate arm portion 345 projects from one end of a generally radial arm 346. As shown in FIG. 20, radial arm 346 extends from a sleeve 347 mounted on shaft 261 between the arms 301 and 302 of frame 29 and held properly positioned thereon by collars 348. As shown in FIGS. 20 and 34, a crank arm 349 projecting radially from the sleeve has a connecting rod 350 connected to a bell crank follower 351 actuated by a cam 353. A spring 354 between bell crank follower 351 and a stationary support actuates the tucker arm 31 to return it to its initial position. It will be noted by reference to FIGS. 32 and 34 that the cam 353 and bell crank follower 351 are generally similar to the cam 152 and bell crank follower 150 for actuating the frame 29, but it will also be observed that the lobe of cam 353 extends beyond the lobe of cam 152 so that the tucker arm 31 is held in engagement with the valve portion V after frame 29 is returned.

*Adjustments*

One of the features of improvement of the apparatus as described above is a construction which facilitates its adjustment for bag tubes T and sleeves S of different shapes and size. These adjustments may be made easily and quickly on parts which are readily available or easily replaceable. For example, the four cams 152, 258, 265 and 353 are formed on the periphery of quickly detachable and interchangeable sleeve 358 clamped in position on the stationary bearing sleeve 44 and the five cams 117, 128, 185, 186 and 325 for actuating the suction or air valves 116, 127, 183, 184 and 324 are each easily and quickly adjustable relative to each other.

Referring to FIGS. 4 to 6 the sleeve 358 having the four cams 152, 258, 265 and 352 on its periphery is of split construction to adapt the two halves of sleeve 358 to be placed around the stationary bearing sleeve 44. The two halves of sleeve 358 are clamped to bearing sleeve 44 by bolts 362 and 363 extending through bosses 364 at the ends of the sleeve portions. The cam sleeve 358 is properly positioned axially of the bearing sleeve 44 by flanges 365 on the bearing sleeve 44. Thus, the cam sleeve 358 is held in proper position longitudinally of the bearing sleeve 44, and can be turned relative thereto to any angular position by merely loosening the bolts 362 and 363. When a bag tube T and sleeve S of a different size and shape is to be used the cam sleeve 358 is removed bodily as a unit and replaced by another similar sleeve having cam tracks of the correct contour for the different bag tube T and sleeve S constructions.

Referring to the lower right hand portion of FIGS. 4 and 21, each of the plurality of cams 117, 128, 185, 186 and 325 for actuating the vacuum and air valves 116, 127, 183, 184 and 324 are of arcuate contour for engaging the stem of its respective valve. Each of the cams 117, 128, 185, 186, and 325 is clamped in position on the lower deck plate 50 of carrier 3 by means of threaded studs 369 projecting upwardly from its cam through an arcuate slot 370 in the deck plate and nuts 371 threaded thereon. Thus, each cam 117, 128, 185, 186 and 325 may be adjusted relative to the other cams of the series by merely loosening the nuts 371 and moving the cam in the arcuate slots 370. It will be observed by reference to FIG. 4 that the nuts 371 are readily available on the top of the lower deck plate 50.

When bag tubes T of a particular size and shape are to be used with the apparatus the position of the side rail 11 for the conveyor 1 is adjusted so that the end of the bag will be properly positioned for engagement by the bag intercepting mechanism 16. No adjustment of the rolls 17 and 18 is required as they rotate at the same peripheral speed as the movement of the carrier 3 regardless of the size or shape of the bag tube T. However, it may be necessary to adjust the position of the rolls 17 and 18 relative to the butterfly spreader 25 to insure initial spreading of the folds of the gusset X. This may be accomplished, as shown in FIGS. 8 and 10, by loosening the bolts 84 and sliding bearing blocks 83 in the slots 85 in the upper and lower arms 72 and 75 of the intercepting mechanism. Such adjustment requires the loosening of the beveled gears 91 to adapt them to slide on their respective shafts 92.

The application of suction to the nozzles 19 and 20 for spreading the folds of the gusset X is controlled by the cam 117 for operating the suction valve 116. The butterfly spreader 25 should seat in the gusset X and this movement is controlled by the opposite pairs of clamps 21, 22 and 23, 24 of the intercepting mechanism 16 on the carrier 3. Such operation of clamps 21, 22 and 23, 24 is controlled by the cam 128 for operating the air valve 127, see FIG. 4, as explained above. The application of suction to nozzles 159 of bag-end-spreader 27 is controlled by the cam 185 for actuating valve 183 while the application of air under pressure to the cylinders 178 for operating gripping fingers 171 of the bag-end-spreaders is controlled by the cam 186 for actuating valve 184. These suction and air valves 116, 127, 183, and 184 need only be initially adjusted for a bag tube T of a particular size or shape.

Figure 23:
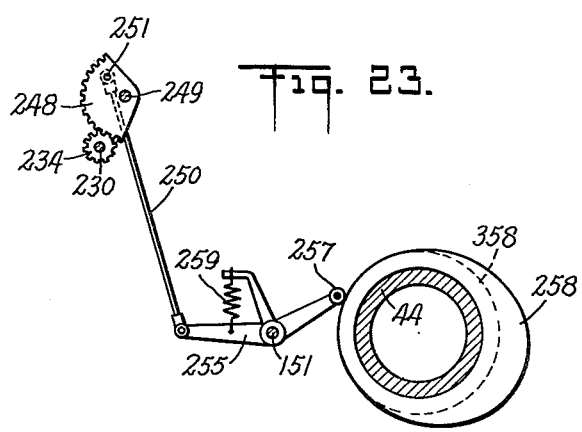
FIG. 23 is a plan view of the cam and linkage for rotating the intermittent feed rolls.
Figure 39:
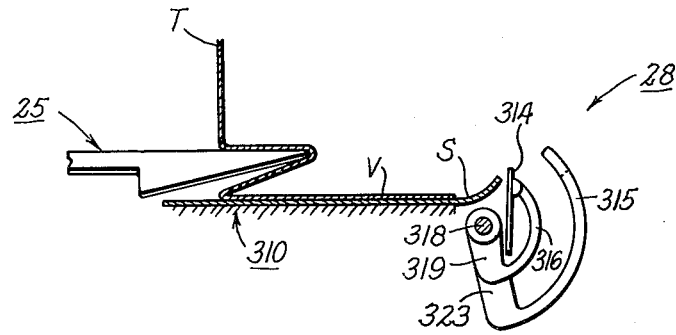
FIG. 39 is an end view showing the sleeve applied to the spread valve portion of a bag tube.

The web of paper P for forming the sleeve S may vary in width for different sized bag tubes T. To adjust for such variation in the width of sleeve S, the supporting plates 192 for the rolls of paper 190 are adjusted upwardly or downwardly by loosening the set screw 195 and turning the supporting plate until the paper is centered relative to the annular groove 224 and rib 225 on the continuously operating feed rolls 196 and 197. If a longer or shorter sleeve S is to be formed the gears 210 and 211 are changed to give the gear ratio required. As shown in FIG. 3, gear 210 is mounted on a shaft 373 projecting upwardly from the top deck plate 49 and gear 211 is mounted on a bracket 374 rotatable on shaft 373. The bracket 374 has an arcuate slot 375 through which a threaded stud 376 extends. A nut 377 is screwed onto the threaded stud to clamp the bracket 374 in adjusted position. Thus, gears 210 and 211 may be changed to give the gear ratio required, and the bracket 374 swung to engage the gear 211 with the driven gear 208 on feed roll 196. As shown in FIGS. 22 and 23, the cam 258 for driving the intermittently operating feed rolls 199 and 200 has a lobe of sufficient height to rotate the feed rolls the required number of revolutions to feed a sleeve S of any length required. The actual feeding of the web of paper P is controlled by the cam 265 for engaging and disengaging the feed rolls 199 and 200. Thus, the position of the cam 265 relative to the cam 258 controls both the beginning of a paper feeding operation, its duration and the return of the end of the web between the jaws 201 and 202 of the adhesive-applying mechanism.

As the operation of the jaws 201 and 202 of the adhesive-applying mechanism is coordinated with the operation of the intermittently operating feed rolls 199 and 200 and as both are operated from the control cam 265 no adjustment is required. The arrangement is such that when the feeding control cam actuates the segment gear 260 to engage the feed rolls 199 and 200 the jaws 201 and 202 of the adhesive-applying means are spaced and when the feed rolls are disengaged, the jaws clamp the end of the paper web P therebetween. In other words, when the ascending portion of the lobe of cam 265 actuates the segment gear 360 to rotate the feed rolls it actuates the clamping jaws 201 and 202 away from each other, but when the descending portion of the cam actuates the feed rolls, it actuates the clamping jaws toward each other.

Figure 40:
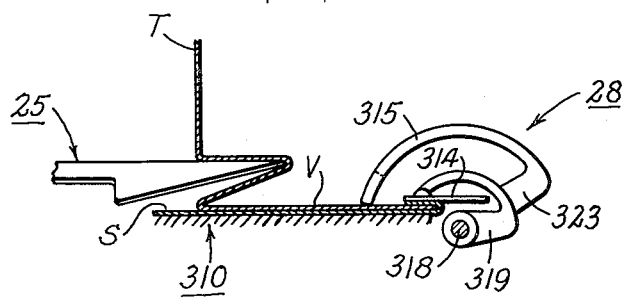
FIG. 40 is a view similar to FIG. 39 showing a bag tube clamped to the platen and the end of the sleeve folded over the end of the valve portion.

When a sleeve S of a different size or shape is to be used, the sleeve-supporting platen 310 is removed and replaced by another platen for the particular sleeve. This is accomplished as shown in FIGS. 36 and 37 by merely removing the bolts. The adjustment of the sleeve folding plates 314 and clamping arms 315 on the platen 310 for their movement from the position in FIG. 39 to that shown in FIG. 40 is accomplished by adjusting the nuts 337 on the connecting rod 335. This causes the rock shaft 326 to be actuated through the required angle. The nuts on the connecting rod 331 are adjusted so as to cause the arms 315 to move into engagement with the unfolded end of the bag tube T and press it against the platen 310 prior to the operation of the folding plates 314 to fold the end of the sleeve over the end of the valve portion V.

It will be apparent from the above that all of the initial adjustments may be easily and quickly made on easily accessible parts and that the apparatus can be adjusted from one size bag tube T and/or sleeve S to another, with a minimum of time and reconstruction of the apparatus.

Mode of Operation

When the apparatus is to be operated, bag tubes T are placed on the conveyor 1 with their ends against the positioning rail 11 and their rearward ends engaging the dogs 10 as illustrated in FIG. 2. This may be done manually or the bag tubes T may be supplied automatically from an elevator feeder or fed directly from a tube forming machine. As shown in FIG. 7, the web of sleeve paper P from the rolls 190 are threaded through the continuously operating feed rolls 196 and 197 and intermittently operated feed rolls 199, 200 with a loop 198 of the web therebetween and then between the jaws 201 and 202 of the adhesive-applying mechanism.

When motor 35 is energized, it drives the conveyor 1, rotating carrier 3 and second conveyor 4 through the gear boxes 36. The dogs 10 on conveyor 1 advance the bag tubes T in a linear path and the rotating carrier 3 rotates a head 14 or 15 in a circular path intercepting the linear path of the conveyor. The relative speeds of the conveyor 1 and the heads 14 or 15 on the carrier 3 are so coordinated that the head moves relative to the rear of a bag tube T until it intercepts the bag tube at a particular angular position of the head as shown in FIG. 2.

As head 14 moves relative to the bag tube T, for example at twice the speed of the bag tube, the rolls 17 and 18 roll over the gusset X to initially spread the folds of the gusset, see FIG. 9. Simultaneously cam 117, shown in FIG. 4, operates the valve 116 to apply suction at the opposed nozzles 19 and 20 on the intercepting mechanism 16, see FIGS. 9 and 16, to augment the initial spreading of the folds of the gusset X. Such spreading of the folds of gusset X permits the butterfly spreader 25, see FIG. 17, to enter the gusset. When the butterfly spreader 25 seats in the gusset X cam 128 on the bottom deck plate 50 of the carrier 3 operates valve 127 to admit air under pressure to the air cylinders 121 of the opposed pairs of clamps 21, 22 and 23, 24 to clamp the bag tube T to the carrier for rotation therewith, see FIG. 17. The bag tube T then rotates with the carrier 3 until it is released by the clamps 21, 22 and 23, 24.

Simultaneously with the operation of valve 127 to apply air under pressure to clamps 21, 22 and 23, 24, cam 185 operates the valve 183 to apply suction to the nozzles 159 on the bag end spreader plates 160 and 161 to initially separate the ends of the bag to be gripped by the bag-end-grippers 164 and 165. After the ends of the bag have been spread, cam 186 operates the valve 184 to apply air under pressure to the air operated cylinders 178 of the bag-end-grippers 164 and 165 to cause the gripping finger 172 to grip the separated ends of the bag, see FIG. 18.

Also simultaneously with the operation of the valves 183 and 184 the triangular shaped wing plates 129 and 130 of the butterfly gusset spreader 25 are operated by cam 152 to spread the gusset X. To this end, cam follower 150, see FIG. 32, mounted on the lower deck plate 50 of the carrier 3 begins to ride over the lobe on stationary cam 152 mounted on the bearing sleeve 44 of the frame during the relative movement of the rotating carrier and stationary cam. Rocking movement of the follower 150 is transmitted through connecting rod 149 to rock the frame 29 from the position shown in FIG. 7 to that shown in FIG. 30. The motion of the frame 29 is transmitted through the connecting rod 146, bell crank 145, connecting rods 143 and 144, actuating arms 141 and 142 to rock the wing plates 129 and 130 of the butterfly spreader 25 to their open position illustrated in FIG. 14. Simultaneously, bell crank 145 actuates connecting rod 158 to rock gear 155 and shaft 162 and the gear 156 and its shaft 163 to move the opposite plates 160 and 161 of the bag-end-spreader 27 to the position illustrated in FIG. 18. Such operation of the butterfly spreader 25 and bag-end-spreader 27 spreads the valve portion V of the bag into a flat plane at right angles to the side thereof as shown in FIGS. 1 and 19 to receive a sleeve S.

As frame 29 is rocked from the position illustrated in FIG. 7 to that illustrated in FIG. 29 it shears a length of paper web P to form the sleeve S. Another cam 325 on the bottom deck plate 50 of the carrier 3, see FIG. 4, operates the valve 324 for supplying air under pressure to the air operated pin clamp 308, see FIGS. 31 and 25, on the platen 310 of the frame 29 to clamp the sleeve S to the guide slot 311. Continued rocking movement of the frame 29 from the position shown in FIG. 29 to that shown in FIG. 30 causes the platen 310 to move the sleeve S into superimposed position on the spread valve portion V of the bag tube T.

Such rocking movement of the frame 29 relative to the carrier 3 causes the linkage connected to the carrier to rock the rock shaft 326 on the rear of the platen 310, see FIGS. 33 and 35. Such movement of the rock shaft 326 is transmitted through the crank arms 329 to first rock the clamping arms 315 into engagement with the inside portion of the valve V and hold it against the platen 310 and thereafter operate the folding plates 314 to fold the end of the sleeve over the end of the valve portion V. The frame 29 is then returned to its initial position during which movement the folding plates 314 and clamping arms 315 release the sleeve S and valve portion V of the bag tube T.

Simultaneously with the forward movement of the frame 29 to a sleeve-applying position, the tucker arm 31 is actuated into engagement with the center of the unfolded valve portion V of the bag tube. This movement is provided by cam follower 351, see FIG. 34, which rides onto the lobe of the cam 352 on the stationary bearing sleeve 44 and acting through the connecting rod 350 rocks the sleeve 347 and crank arm 346 moves the curved arm 345 constituting the tucker 31 through the slot 313 in the platen 310. The cam 352 is so formed as to hold the end of the tucker 31 in engagement with the valve portion V while the platen 310 and bag-end-spreader 27 are returned to their initial position. Such movement of the bag-end-spreader 27 with respect to the tucker arm 345 causes the valve portion V to be folded in the manner illustrated in FIG. 1 to form a valve in the corner of the bag tube T with the sleeve attached thereto and extending outwardly therefrom.

After the valve has been formed in the bag tube T, valve 127, see FIG. 4, is released by cam 128 and the clamps 21, 22 and 23, 24 are operated by springs 123, see FIGS. 9 and 17, to release the bag tube. When the bag tube T is released it falls onto the second conveyor 4. Conveyor 4 moves at a faster rate than the head 14 to move the bag tube T in a linear path away from the carrier 3 to clear the head. The folded valve is pressed by the opposed rolls 5 during its movement on conveyor 4 which press the formed valve into the flat plane of the bag tube. Conveyor 4 then delivers the bag tubes to the sewing machine heads 6 and 7 where tapes 32 are folded over the ends of the bag tube and the taped ends sewed to complete the formation of the bag.

During the continued rotation of the head 14 or 15 on the carrier 3 from the bag tube discharging position to a bag tube intercepting position, the sleeve-forming mechanism is operated to advance a length of sleeve paper P onto the platen 310. It will be understood that during such return movement of the head 14 or 15 the opposite head moves through its sleeve-applying and valve-forming positions. As shown in FIG. 3, toothed belt 222 rotates gear 210 which, acting through idler gears 211 and driving gear 208, rotates the continuously operating feed rolls 196 and 197 to feed the web of paper P from the roll 190 into the loop 198.

Also during rotation of the carrier 3 from the bag tube discharging position to the bag tube intercepting position, feed roll 200 of the intermittently operated set of feed rolls is moved into engagement with feed roll 199 and the feed rolls are rotated to advance a length of paper P. The lateral movement of feed roll 200 is produced by the cam follower 264, see FIG. 22, which rides onto the lobe of cam 265 and acting through connecting rod 263 rocks the segment gear 260 and trunnion 238 of yoke frame 240. Such rocking movement of the yoke frame 240, see FIG. 20, moves the eccentrically mounted feed roll 200 toward the feed roll 199 to grip the web of paper P therebetween. While the web of paper P is gripped between feed rolls 199 and 200, the cam follower 255, see FIG. 23, rides on the lobe of cam 258 to rotate the rolls 199 and 200. Such rotation of the rolls advances a length of paper web P onto the platen 310. As previously explained the frame 29 then rocks to shear the sleeve S from the web. During such shearing of the sleeve S a flat portion on the cam 258 prevents rotation of the feed rolls 199 and 200.

Following the shearing of the sleeve S from the web P the cam follower 255 rides down the lobe of the cam 258 and is actuated by the spring 259 to rock the segment gear 248 in the opposite direction. This reverse movement of the segment gear 248 reverses the direction of rotation of the feed rolls 199 and 200 to withdraw the end of the paper web P to position it between the adhesive-applying jaws 201 and 202. The lobe of cam 265 then releases the cam follower 266 to reverse its direction of movement and the oscillation of the segment gear 260 to rock the yoke frame 240 and disengage the feed roll 200 from feed roll 199. Thus, the relative position of the cams 258 and 265 control the feeding of the sleeve and the withdrawing of the paper web.

Jaws 201 and 202 of the adhesive-applying mechanism are operated by the cam follower 264 for rocking the yoke frame 240. Thus when the feed roll 200 is moved out of engagement with the feed roll 199 the jaws 201 and 202 are moved toward each other to clamp the end of the web P therebetween to apply a band of adhesive transversely thereof and form a transverse crease 291 at the rear of the band of adhesive. The projections 287 of adjustable plates 285 and 286 deflect the sides of the web of paper P away from adhesive-applying face of jaw 201 so that no adhesive is applied to the portion of paper web which feeds through the sleeve guides 311 and 312 on the platen 310.

Thus, an apparatus is provided which automatically intercepts bag tube T as they are advanced on a linear conveyor 1, advances the bag tubes through a circular path on the carrier 3 where a sleeve is formed and applied to the bag tubes and a valve formed therein and then delivers the bag tubes to a second conveyor 4 which advances them to the sewing machine heads 6 and 7 where the ends of the bags are sewed to complete the fabrication of sleeved valve bags from paper tubes.

While a single embodiment of the invention is herein illustrated and described it will be understood that changes may be made in the construction and arrangement of elements without departing from the spirit or scope of the invention. Therefore, without limitations in this respect the invention is defined by the following claims.

I claim:

1. In an apparatus for making bags from flat paper blanks, a continuously moving conveyor for advancing the bag blanks successively in a linear path, a continuously rotating carrier having clamping means thereon movable in a circular path intercepting the linear path of the conveyor, means for operating the clamping means to clamp successive bag blanks on the conveyor to the carrier for movement with the latter and release the bag blanks therefrom, means attached to and rotatable with the carrier for forming sleeves and applying them to the valve portions of the bag blanks during their rotation with the carrier, and means for controlling the clamp operating means to clamp bag blanks to the carrier and release the sleeved bag blanks therefrom whereby to apply a sleeve to a bag blank without stopping the blank.

2. In an apparatus for making bags from flat paper blanks having a valve portion, a conveyor for advancing the bag blanks successively in one linear path, a second conveyor for advancing bag blanks in another linear path, a rotating carrier having clamping means thereon movable in a circular path in a plane common with and intercepting the linear paths of the first and second conveyors, means for driving the two linear conveyors and rotating carrier to move a bag tube in a continuous path in said common plane, means for operating the clamping means to clamp successive bag blanks on the first conveyor to the carrier for movement therewith, means attached to and movable with the carrier for making sleeves and applying them to the valve portion of the bag blanks during their rotation with the carrier, and means for controlling the clamp operating means to clamp bag blanks to the carrier and release the sleeved bag blanks therefrom to the second conveyor.

3. In an apparatus for making bags from paper blanks having a valve portion, a conveyor for advancing bag blanks successively in a linear path, a stationary support, a carrier mounted to rotate on said support, driving means for continuously rotating said carrier on said support, intercepting mechanism on the carrier having clamps for clamping bag blanks to the carrier for rotation therewith, sleeve-forming and-applying mechanism attached to and rotatable with the carrier for making sleeves and applying them to the valve portion of the bag blanks, and means operated by the relative movement of the carrier and its stationary support for automatically actuating the clamps of the intercepting-mechanism and operating the sleeve-forming and-applying mechanism, respectively, during the continuous rotation of the carrier.

4. In an apparatus for making bags from paper blanks having a valve portion, a conveyor for advancing bag blanks successively in a linear path, a stationary support, a carrier mounted to rotate on said support, intercepting mechanism on said carrier for clamping bag blanks thereto for rotation therewith, sleeve-forming and-applying mechanism attached to and rotatable with said carrier for forming a sleeve and applying it to the valve portion of each bag blank while the latter is clamped to said carrier, valve-forming mechanism mounted on and rotatable with said carrier for folding the sleeved valve portion of the bag tube to form a valve, and means operated by the relative movement of the carrier and its stationary support for automatically actuating the intercepting, sleeve-forming and-applying and valve-forming mechanisms, respectively.

5. In an apparatus for making bags from paper blanks having a valve portion, a stationary support having a horizontal bearing surface and a vertically arranged axial bearing sleeve, a rotatable carrier supported on the horizontal bearing and having a depending shaft journaled in the sleeve, driving means for rotating the carrier on the stationary support, bag-blank-clamping mechanism on the carrier, sleeve-forming and-applying mechanism attached to the carrier for rotation therewith, and means operated by the relative movement of the carrier and its support for controlling the operation of the bag-blank-clamping and sleeve-forming and-applying mechanisms in a predetermined timed sequence corresponding to a particular angular position of the respective mechanisms.

6. In an apparatus for forming sleeved valves in paper blanks, a stationary support, a carrier mounted to rotate on said support, means for rotating said carrier continuously, bag-intercepting mechanism on said carrier having clamping means, sleeve-forming and -applying mechanism mounted on and rotatable with said carrier comprising means for feeding lengths of sleeve paper, means for applying adhesive to one end of the paper and means for severing the length of paper advanced by the feeding means to form sleeves, valve-forming mechanism mounted on and rotatable with said carrier, driving means for each of the respective mechanisms, and a cam for each of said mechanisms mounted on the stationary support for actuating its respective driving means in timed sequence during the rotation of the carrier relative to the stationary support.

7. In an apparatus for making bags from flat paper tubes, a stationary support having a hub, a carrier mounted to rotate on said support around said hub as an axis, bag-end-spreading mechanism mounted on said carrier, sleeve-forming and -applying mechanism mounted on and rotatable with said carrier, valve-forming mechanism mounted on and rotatable with said carrier, driving means for each of said mechanisms, a member detachably mounted on said axial hub and having a cam for each of the respective driving means to control operation of the mechanisms in sequential order, and said detachable member being interchangeable with other members having cams of different forms for bag tubes of different sizes and shapes.

8. In an apparatus for making bags from flat paper tubes having their sides infolded to form gussets, a stationary support, a carrier mounted to rotate on said support, suction nozzles mounted on said carrier to initially spread the folds of one of said gussets, clamps for clamping bag tubes to the carrier for rotation therewith, bag-end-spreaders on the carrier having grippers for gripping the end of the bag, air operated motors for actuating the clamps and bag-end grippers, respectively, valves for controlling the suction nozzles and air motors for the respective elements, cams for operating the valves, said valves and cams being mounted for relative movement on the support and carrier, and said cams being mounted for adjustment relative to the valves.

9. Apparatus in accordance with claim 1 in which the carrier is mounted to rotate on a stationary support, driving means for continuously rotating said carrier on said stationary support and means actuated by the relative movement between the stationary support and rotating carrier to operate the clamping means to clamp successive bag blanks at one angular position of the clamping means and release successive bag blanks at another angular position of the clamping means.

10. Apparatus in accordance with claim 1 in which a plurality of separate clamping means are mounted in angularly spaced relationship on the rotating carrier to successively intercept bag blanks on the linear conveyor.

11. Apparatus in accordance with claim 1 in which the carrier is mounted to rotate on a stationary support, said sleeve-forming and -applying means comprising means for mounting a web of paper of a width corresponding to the width of a sleeve to be formed, means on said carrier for feeding a length of said web of paper, shearing means on said carrier for severing the length of paper advanced by said feeding means to form a sleeve, and driving means operated by the relative movement of said carrier and stationary support to operate the paper feeding and shearing means.

12. Apparatus in accordance with claim 11 in which the shearing means comprises a movable frame having a shearing blade and a sleeve-supporting platen projecting outwardly from the shearing blade, a stationary shearing blade on the carrier adjacent the frame, said feeding means advancing a length of paper from the web between the shearing blades and onto the platen, and means for moving the frame relative to the stationary blade to sever a length of paper corresponding to the length of the sleeve and move the severed sleeve on the platen to the valve portion of the bag blank.

13. Apparatus in accordance with claim 12 in which the frame is pivotally mounted on the carriage for rocking movement above an axis parallel to the rotatable axis of the carrier, and said moving means rocking the pivoted frame relative to the stationary blade to sever a sleeve from the web of paper and transfer it to the valve portion of the bag.

14. Apparatus in accordance with claim 11 in which the means for feeding a length of paper from the continuous web are opposed feed rolls for gripping the web of paper therebetween, and means operated by the rotation of the carrier for rotating the feed rolls.

15. Apparatus in accordance with claim 14 in which means are provided for moving the feed rolls toward and away from each other to control the length of the sleeve advanced by the feed rolls.

16. Apparatus in accordance with claim 14 in which the feed rolls are intermittently operated to advance predetermined lengths of paper from the web, a second pair of feed rolls for continuously feeding paper from the web to form a loop of the paper between them and the intermittently operated feed rolls, and means operated by the movement of the carrier for continuously rotating the second pair of feed rolls.

17. Apparatus in accordance with claim 12 in which an adhesive-applying means is provided on the carrier for applying a band of adhesive across one end of the paper web during movement of the frame to apply a previously formed sleeve to a bag blank whereby each length of paper web advanced by the feed rolls has adhesive applied to the end thereof.

18. Apparatus in accordance with claim 14 having means for transversely creasing the paper web adjacent its severed end, means for operating the feed rolls to advance a length of the web of paper onto the platen of the frame and thereafter reverse the direction of rotation of the feed rolls to retract the end of the web for engagement by the creasing means, and means for applying adhesive to the creased end of the web.

19. Apparatus for forming valves in paper tubes having gusset folds at each side with a valve extension at the end of one of the gusset folds, comprising, means for supporting a bag tube, a stationary support, a carrier mounted to rotate on the stationary support and having clamping means movable through a circular path in the same plane as the bag supporting means and intercepting a bag thereon, driving means for continuously rotating the carrier on said support, means for operating the clamping means to clamp the bag tube to the carrier for movement therewith, and valve-forming mechanism having means mounted on and rotatable with said carrier for spreading the end portion of a gusset fold and valve extension into a common plane and a movable tucker mounted on and rotatable with said carrier for infolding the spread end of the bag to form a valve, and means actuated by the rotation of the carrier for operating the valve-forming mechanism during rotation of the carrier to form a valve in the bag without stopping the bag.

20. Apparatus in accordance with claim 19 in which the movable tucker is an arm pivotally mounted on the carrier, and means for oscillating the tucker arm to infold the extended valve portion at right angles to the edge of the bag tube to form a valve therein.

21. Apparatus in accordance with claim 20 in which the means for supporting a bag tube is a conveyor for advancing successive bag tubes in a linear path, a second conveyor for receiving the valved bag tubes from the carrier, and means for operating the clamping means on the carrier to release the valved bag tubes therefrom and deliver them onto the second conveyor.

22. Apparatus in accordance with claim 21 in which sewing machines are positioned to receive the bag tubes from the second conveyor and sew their ends to complete the formation of valved paper bags.

23. Apparatus in accordance with claim 19 in which the valve-forming mechanism comprises a pair of opposed rolls yieldingly mounted on the rotatable carrier to roll over the gusseted edge of a bag tube on the conveyor to initially spread the gusset folds.

24. Apparatus in accordance with claim 23 in which the valve-forming mechanism comprises a gusset spreader mounted at the rear of the rolls on the carrier to enter the initially spread gusset fold, and means for operating the gusset spreader to further spread the folds of the gusset into a common plane.

25. Apparatus in accordance with claim 24 in which the gusset spreader comprises a pair of triangular wing plates pivotally mounted on a common axis for movement toward each other into superimposed parallel relationship, and means operated by the rotation of the carriage to rock said triangular wing plates away from each other on their common axis to spread the gusset folds into a common plane.

26. Apparatus in accordance with claim 25 in which the valve-forming mechanism comprises bag-end-spreading means having grippers for engaging the ends of the bag tubes, means for operating the grippers to unfold the valve extension of the bag tube into a common plane with the unfolded gusset, a pivoted tucker for infolding the spread valve portion of the bag tube, and means operated by the rotating movement of the carrier for actuating the clamping means, gusset spreader, bag-end-spreading means and tucker in timed relation during the progressive rotation of the carrier to form a valve in the bag tube.

27. In an apparatus for making bags from paper tubes having an infolded portion at one side to provide a gusset, means for supporting a bag tube, a gusset spreader, means for relatively moving the bag tube supporting means and gusset spreader, a pair of opposed rolls mounted at a fixed location relative to and ahead of the gusset spreader so as to roll over the opposite sides of the gusset during the relative movement of the bag tube and gusset spreader, and means for rotating the rolls whereby to initially spread the gusset folds to permit the gusset spreader to enter the gusset.

28. Apparatus in accordance with claim 27 in which the opposed rolls are mounted on pivoted arms, and springs for rocking the arms to yieldingly engage said rolls with the opposite sides of the bag tube.

29. Apparatus in accordance with claim 28 in which driving means are provided on the arms for rotating the rolls.

30. Apparatus in accordance with claim 28 in which suction nozzles mounted on said arms to augment the spreading of the gusset folds initiated by the rolls.

31. Apparatus in accordance with claim 27 in which the gusset spreader comprises a pair of wing plates pivotally mounted to rock on a common axis, and means for rocking the wing plates on their common axis from an overlying closed position to an opposed open position to spread the gusset.

32. Apparatus in accordance with claim 27 in which the gusset spreader and pair of opposed rolls are mounted for movement as a unit relative to the bag tube.

33. In an apparatus for making bags from paper tubes, means for supporting a flat bag tube, a movable carrier having a bag-tube-intercepting mechanism with spaced arms forming a mouth therebetween, means for mounting the movable carrier to move the spaced arms in planes parallel to a flat bag tube on the supporting means at opposite sides thereof, driving means for moving the carrier and bag-tube-intercepting mechanism relative to a bag tube to cause one side of the latter to enter the mouth between the spaced arms, opposed clamps, movably mounted on said arms for movement toward each other, and means for actuating said clamps to clamp the bag tube to said intercepting means for movement with the carrier.

34. Apparatus in accordance with claim 33 in which the arms are pivotally mounted, springs for actuating said arms towards each other, and stops engaged by said arms to limit their movement away from each other when the opposed clamps are actuated.

35. Apparatus in accordance with claim 33 in which the bag tube has an infolded portion at one side to provide a gusset, and opposed rolls mounted on said arms to roll over the gusset and initially spread the folds thereon.

36. Apparatus in accordance with claim 33 in which one pair of opposed clamps is mounted to overlie the gusset at one side of the bag tube, and another pair of opposed clamps are mounted on said arms to overlie said bag tube inwardly from the gusset and at one side of the first mentioned pair of opposed clamps.

37. In an apparatus for making bags from paper tubes having infolded portions at its sides to provide gussets, means for supporting a bag tube, intercepting mechanism having spaced arms forming a mouth therebetween, said arms being pivotally mounted for rocking movement, springs for rocking said arms towards each other, means for moving the intercepting mechanism relative to the bag tube to cause the side of the latter to enter the mouth between the spaced arms, opposed rolls mounted on the spaced arms to roll over the gusset at one side of the bag tube to initially spread the folds thereof, opposed suction nozzles on the arms at the rear of the rolls in the direction of movement to augment the initial spreading of the gusset folds, a gusset spreader mounted on the intercepting mechanism to enter the initially spread folds of the gusset, opposed clamps mounted on said arms, means for operating the opposed clamps to clamp the bag tube to the intercepting mechanism and stops on the intercepting mechanism to limit the rocking of the pivotally mounted arms away from the bag tube.

38. In an apparatus for applying sleeves to the valve portion of bag tubes, sleeve-forming mechanism comprising feed rolls, means for operating said feed rolls to intermittently feed lengths of paper from a continuous web and shearing means for severing the lengths of paper advanced by the feed rolls to form sleeves, adhesive-applying mechanism comprising opposed members at opposite sides of the web and mounted for movement toward and away from each other, each of the opposed members being in the form of U-shaped frames pivotally mounted on the feed rolls for rocking movement thereon, means for feeding adhesive to the face of one of the members, driving means rocking said frames toward and away from each other on said feed rolls, to clamp the end of the paper web therebetween and apply a band of adhesive across the web on one side thereof, and said driving means operating the adhesive applying members toward each other during the dwell of the feed rolls to apply adhesive to the end of the web after which the feed rolls feed a length of the web to be sheared.

39. Apparatus in accordance with claim 38 in which plates are adjustably mounted on the end of one of the adhesive-applying members, said plates having projections extending inwardly from the adhesive-applying face, the other member having an anvil plate of less width than the paper web, and said projections deflecting the sides of the paper web away from the adhesive-applying face to limit the band of adhesive to the center portion of the web.

40. Apparatus in accordance with claim 38 in which means for controlling the operation of the feed rolls and adhesive-applying members are actuated by a common cam to move the members toward each other to apply adhesive to the end of the web while the feed rolls are inoperative and move the adhesive-applying members away from each other when the feed rolls are operative to advance the web of paper.

41. Apparatus in accordance with claim 38 in which said driving means comprises crank arms projecting from the frames, links connecting the crank arms to a common pivot to provide a toggle, a cam, and linkage actuated by the cam for moving the common pivot of the toggle to rock the arms toward and away from each other.

42. Apparatus in accordance with claim 38 in which the feed rolls are mounted to rotate on vertical axes to advance the web in a vertical plane, said opposed adhesive-applying members comprising vertical bars, the vertical bar of one of said members being hollow and having perforations extending to an adhesive-applying face, means for supplying adhesive to the interior of the hollow bar, and said other bar constituting an anvil.

43. Apparatus in accordance with claim 42 in which a well is provided below the vertical bar of the adhesive-applying jaw.

44. Apparatus in accordance with claim 38 in which the opposed members have a cooperating rib and groove, respectively, to form a transverse crease in the web at the rear of the band of adhesive applied thereto.

45. In an apparatus for applying sleeves to the valve portions of paper tubes, sleeve-forming mechanism comprising supporting structure having spaced plates, a shaft extending through said plates, a C-shaped frame having a cutter bar with arms at its opposite end pivotally mounted on said shaft for rocking movement thereon, a stationary bar extending between said plates and having a cutting edge aligned with the cutting bar on the rocking frame, feed rolls rotatably mounted between said plates to feed a web of paper between said cutter bars, means for rocking said frame to shear a length of paper advanced by the feeding means, and driving means for the feed rolls and frame rocking means to alternately advance the web of paper and shear the advanced length of paper from the web.

46. Apparatus in accordance with claim 45 in which the stationary and movable cutter bars extend at an angle to the edge of the paper web to shear the web on a bias.

47. Apparatus in accordance with claim 45 in which a sleeve is mounted to rock on said shaft, a tucker arm projecting from said sleeve, driving means for rocking the sleeve and tucker arm on said shaft in timed relation to the rocking movement of said frame.

48. Apparatus in accordance with claim 45 in which a platen is detachably mounted on the bar of the C-shaped frame to adapt platens to be interchanged for sleeves of different size and shape.

49. Apparatus in accordance with claim 48 in which the platen has spaced guide slots thereon through which the sides of the paper web are advanced by the feed rolls.

50. Apparatus in accordance with claim 49 in which clamping means are provided for clamping one edge of the paper to one of the guide slots in the platen, and means coordinated with the movement of the feed rolls to actuate the sleeve clamp after the length of paper has been fed onto the platen and severed from the web.

51. In an apparatus for making bags from flat paper tubes, a conveyor for advancing the bag tubes successively in a linear path, a continuously rotating carrier having bag intercepting means mounted thereon and rotatable therewith in a circular path in the same plane as and intercepting the linear path of the conveyor, clamps on the intercepting means for clamping a bag tube to the carrier, spaced bag tube spreaders on the intercepting means for receiving a bag tube therebetween during the relative movement of the carrier and bag tube; grippers on the bag tube spreaders for gripping the opposite sides of the bag tube at one end, and means on the carrier for rocking the grippers to engage the bag tube and then rocking the bag tube spreaders during rotation of the carrier to spread the end of the bag tube.

52. In an apparatus for making sleeved valves on bag tubes, a rotating carrier having bag intercepting means mounted thereon and rotatable therewith, clamps on the intercepting means for clamping a bag tube to the carrier, sleeve-forming mechanism mounted on the carrier for rotation therewith, said sleeve-forming mechanism comprising means for mounting a continuous web of sleeve paper, opposed feed rolls for feeding the web of paper, means for driving said feed rolls, and means for moving one of the feed rolls laterally toward and away from the other feed roll to control the feeding of the web of sleeve paper and length of web fed thereby to form a sleeve of the proper length during rotation of the carrier.

53. In an apparatus for applying sleeves to the valve portion and bag tubes, a rotating carrier having intercepting means mounted thereon and rotatable therewith, clamps on said intercepting means for clamping a bag tube to the carrier, said carrier having spaced plates, sleeve-forming mechanism mounted on the carrier for rotation therewith comprising a shaft extending between said plates, a C-shaped frame having a cutter bar with arms at its opposite ends pivotally mounted on said shaft for rocking movement thereon, a stationary bar extending between said plates and having a cutting edge aligned with the cutting bar on the rocking frame, feed rolls rotatably mounted between said plates to feed a web of paper between said cutter bars, means for rocking said frame to shear a length of paper advanced by the feeding means, means for operating the feed rolls and frame rocking means to alternately advance the web of paper and shear the advanced length of paper from the web to form a sleeve during a rotation of said carrier, and means on the carrier for applying the sleeve to one end of the clamped bag tube and folding the end of the bag tube to form a sleeved valve thereon.

54. Apparatus in accordance with claim 51 in which the bag tubes have infolded portions at its sides to provide gussets, a gusset spreader having a pair of wing plates adapted to enter one of the gussets, and said gusset spreader being positioned between and operated simultaneously with the spaced bag-end-spreaders.

55. Apparatus in accordance with claim 51 in which the spaced bag-end-spreaders are in the form of plates, opposed suction nozzles mounted on said plates, said grippers overlying said plates for gripping the opposite ends of the bag tube, and means for actuating the grippers.

56. Apparatus in accordance with claim 53 in which the platen has a central slot and a tucker arm mounted to rock on said shaft and projecting through the slot in the platen to engage the sleeve on the platen.

57. Apparatus in accordance with claim 56 in which separate cams are provided for rocking the C-shaped frame and tucker arm, and said cams being so related as to cause the tucker arm to be retained in engagement with the sleeve when the C-shaped frame and platen mounted thereon are moved rearwardly to their initial position.

58. Apparatus in accordance with claim 52 in which said laterally movable feed roll is mounted to rotate in a U-shaped frame having trunnions, said trunnions being mounted to rock in fixed bearings, and means for rocking the frame to cause the eccentrically mounted feed roll to move toward and away from the other feed roll.

59. Apparatus in accordance with claim 52 in which said feed roll movable toward and away from said other roll is rotatably mounted eccentrically in journals, means comprising a driven gear for rotating the journals, a driving gear meshing with said driven gear, and means to oscillate said driving gear to engage and disengage said eccentrically mounted feed roll with said other roll.

60. Apparatus in accordance with claim 52 in which one of the feed rolls is mounted to rotate about a fixed axis, said feed roll having a driven gear and a driving gear, the other of said rolls being mounted eccentrically in trunnions projecting from a U-shaped frame, said trunnions being mounted in fixed bearings to rotate about a fixed axis, a driven gear on said frame for rocking the frame and its trunnions relative to the fixed bearings to move the feed roll mounted therein toward and away from said other feed roll, segment gears meshing with the driven gears on the feed roll and frame, respectively, and driven means for oscillating the segment gears comprising cams for controlling the period during which the feed rolls rotate and the period of engagement of the feed rolls during their rotation.

References Cited in the file of this patent

UNITED STATES PATENTS

| | | |
|---|---|---|
| 620,981 | Severin | Mar. 14, 1899 |
| 1,859,962 | Ferenci | May 24, 1932 |
| 1,937,675 | Twomley | Dec. 5, 1933 |
| 2,387,274 | Lee | Oct. 23, 1945 |
| 2,430,281 | Eaton et al. | Nov. 4, 1947 |
| 2,474,160 | Peyrebrune | June 21, 1949 |
| 2,527,295 | Belcher et al. | Oct. 24, 1950 |
| 2,528,860 | Clark | Nov. 7, 1950 |
| 2,590,806 | Vorderstrasse | Mar. 25, 1952 |
| 2,676,444 | Gaubert | Apr. 27, 1954 |
| 2,693,741 | Speicher et al. | Nov. 9, 1954 |
| 2,740,334 | Allen et al. | Apr. 3, 1956 |

FOREIGN PATENTS

| | | |
|---|---|---|
| 168,173 | Great Britain | Sept. 1, 1921 |